(12) United States Patent
Greenfield et al.

(10) Patent No.: US 7,404,177 B1
(45) Date of Patent: Jul. 22, 2008

(54) AUTOMATED WEB INTERFACE GENERATION FOR SOFTWARE CODED APPLICATIONS

(75) Inventors: Paul Aubrey Greenfield, Stanmore (AU); Charles Zdzislaw Loboz, Hornsby (AU); Mark Alexander Hugh Emberson, Christchurch (NZ)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/830,226

(22) PCT Filed: Oct. 23, 1998

(86) PCT No.: PCT/AU98/00885

§ 371 (c)(1),
(2), (4) Date: Apr. 23, 2001

(87) PCT Pub. No.: WO00/25209

PCT Pub. Date: May 4, 2000

(51) Int. Cl.
*G06F 9/44* (2006.01)

(52) U.S. Cl. .................. 717/106; 717/107; 719/313; 719/332

(58) Field of Classification Search ............. 709/310, 709/316; 717/106–108, 110–119, 136–140; 719/310–320, 328–332
See application file for complete search history.

(56) References Cited

U.S. PATENT DOCUMENTS 5,960,200 A * 9/1999 Eager et al. ............... 717/147
5,974,256 A * 10/1999 Matthews et al. .......... 717/141
6,662,236 B1 * 12/2003 Apte et al. ................. 719/320

FOREIGN PATENT DOCUMENTS

| EP | 0806731 | 11/1997 |
|---|---|---|
| WO | 97/27537 | 7/1997 |
| WO | 97/37303 | 10/1997 |

OTHER PUBLICATIONS

Harold, Using Component Methods in an Applet, Jun. 26, 1998.*
Phanourious et al, Transforming Command-Line Driven Systems to Web Applications, Sixth International World Wide Web Conference, Apr. 7-11, 1997, pp. 1-11.*
Derwent Abstract Accession No. 98-385525/33, RD 41031, (IBM-Research Disclosure).
International Search Report, dated Dec. 30, 1998.

* cited by examiner

*Primary Examiner*—Meng-Ai An
*Assistant Examiner*—Diem K Cao
(74) *Attorney, Agent, or Firm*—Alfred W. Kozak; Robert P. Marley; Charles A. Johnson

(57) ABSTRACT

A method is disclosed for adapting a legacy software application developed for an environment comprising a centralized computing resource interconnected to a series of computer terminal devices applications to a network environment wherein the network environment can comprise a system of distributed, interconnected network computing resources, the method comprising the steps of: creating translatable source code and executable code for the initial legacy software application and; utilizing the translatable source code to produce a series of software components, the components being executable by at least one of the computing resources in the network environment, and upon execution, the computing resource is caused to interconnect with the executable code of the legacy software application over the network so as to interact with the legacy software application in the transmission or receipt of information to and from the legacy software application.

31 Claims, 19 Drawing Sheets

Ispec MakeSale (customer, product, amount) ← 55

MakeSale Ispec component ← 56
private data (customer, product, amount)
method getField(name) returns string;
method setField(name, value);
method getErrorCount();
method getError(error_no);
......

```
Sale=linc.getIspec('Sale')
Vend=linc.getIspec('Vend')
OtherSale=linc.getIspec('Sale')
......
Sale.setField('customer',cust_no)
Sale.setField('product',prod_no)
Sale.setField('amount',sale_amount)
success=linc.simpleTransaction(Sale)
if success==OK then...
    : : :
    : : :
    : : :
```

*Figure 6*

AUTOMATED WEB INTERFACE GENERATION FOR SOFTWARE CODED APPLICATIONS

This application is the U.S. national-phase application of PCT International Application No. PCT/AU98/00885.

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all-copyright rights whatsoever.

FIELD OF THE INVENTION

The present invention relates to the automated creation of software programs for interfacing with existing applications.

BACKGROUND OF THE INVENTION

Historically, large computer software programs utilizing large databases were traditionally constructed in a mainframe environment.

The mainframe environment was one where a large data processing resource was interconnected to a large number of "dumb terminals". The dumb terminals had minimal computational capabilities and were effectively utilized to display results on a screen and to input data from a keyboard. The terminal was primarily under control of the mainframe computer system which carried out almost all the computational activity.

For many years, large investments were made, and are still made, for developing software programs for such an environment. The desirability for higher and higher productivity levels in such an environment lead to the creation of "Fourth Generation Languages (4GL)" which sought to enhance a programmers productivity by providing for the automated generation of various code components including screen layouts etc. These 4GL programming languages normally utilized a series of templates which were filled in by a user and, after a subsequent "compilation" phase, the templates were transformed into interlinking code by a compiler system. One such 4GL language is the "Logical Information Network Compiler" otherwise known as "LINC" available from Unisys Corporation, which has the ability to create output for a dumb terminal screen and for GUI forms.

Whilst the mainframe environment dominated the computer industry for a number of years, the exponential increases in microprocessor power and memory capacity has lead to a proliferation of "personal computer" type systems having, in recent years, complex graphical user interfaces. Further, during the 1990's there has been an explosion in the interconnection of computers in a somewhat ordered manner in the form of the Internet providing distributed processing facilities, email, file transfer and in particular, worldwide web facilities. The rise of the Internet could be said to be primarily due to the high synergistic effects resulting from the somewhat seamless interconnection together of a large number of computer systems for the exchange of information. The rise of the Internet has been somewhat spectacular and has led to an acceleration in new software deployment and functionality. As a result, most organisations are keen to utilize the potential of the Internet to the maximum extent possible including adapting their systems to utilization over the worldwide web or to utilize the technology of the worldwide web such as browsers in a more severe manner on a closed loop basis such as via an intranet.

There is therefore a significant incentive to rapidly adapt the substantial investment previously made in mainframe type computer software applications to an Internet environment so as to leverage the potential of the Internet in organisational activities. It is also obviously desirable to facilitate the adaptation of mainframe type applications to the internet as quickly and inexpensively as possible.

SUMMARY OF THE INVENTION

It is an object of the present invention to provide for a system for rapidly adapting a 4GL type application to an Internet environment.

In accordance with a first aspect of the present invention, there is provided a method for adapting a legacy software application developed for an environment comprising a centralized computing resource interconnected to a series of computer terminal devices to a network environment wherein the network environment can comprise a system of distributed, interconnected network computing resources, the method comprising the steps of: creating translatable source code and executable code for the initial legacy software application and; utilizing the translatable source code to produce a series of software components, the components being executable by at least one of the computing resources in the network environment, and wherein upon execution, the computing resource is caused to interconnect with the executable code of the legacy software application over the network so as to interact with the legacy software application in the transmission or receipt of information to and from the legacy software application.

The legacy software application is preferably a 4GL application.

Preferably, this software application includes interface specification definitions which includes a definition of a screen format for user interface. Preferably, the method of the present invention includes the step of generating a series of interactive screen software components from the interface specification definitions defining the screen formats, the user interface software components being arranged for execution on the network computing resource to provide a graphical user interface providing at least the data entry and display facilities of the terminal.

The series of software components are ideally loadable and executable by an Internet Browser and can comprise Java code applets. The series of software components are preferably also executable by scripting languages running on the network computing resource.

The translatable source code preferably can include a series of data fields and the series of software components can include object oriented methods for setting or obtaining values of the series of data fields.

The network environment can comprise the Internet network utilizing, for example TCP/IP transfer protocols.

The translatable source code can be written in the LINC language or other 4LGs.

The present invention further provides a method for adapting a 4GL legacy software application including template definitions from which a legacy software application can be generated, comprising the steps of utilizing said template definitions to produce a series of software components, said components being executable by at least a computing resource in a network environment comprising a system of distributed, interconnected network computing resources, and wherein upon execution, said computing and resource is caused to interconnect with the 4GL legacy software applications so as to interact with the legacy application in the transmission and receipt of information to and from the legacy application.

Preferably the template definitions are interface specifications, as discussed above.

BRIEF DESCRIPTION OF THE DRAWINGS

Notwithstanding any other forms which may fall within the scope of the present invention, preferred forms of the invention will now be described, by way of example only, with reference to the accompanying drawings in which:

FIG. 6 illustrates a code fragment;

DESCRIPTION OF PREFERRED AND OTHER EMBODIMENTS

Although the present invention may be applied with other 4GL languages, the preferred embodiment, a description of which follows, has been developed for use with the LINC System, available from Unisys Corporation. The LINC System is very well known, with a large number of users worldwide. Before turning to a description of the preferred embodiment of the invention, however, it is useful to give a brief review of the LINC System and this will now be given with reference to FIGS. 17 through 19.

The LINC Development System is adapted to develop transaction based systems and utilises interface specifications (ISPECS) to provide definitions from which the run time transaction system is generated. Each ISPEC defines:

Data to be processed by the transaction.

Screen format on the user interface

High level logical business rules that describe how transaction data is processed.

LINC then does the rest, to set up the run time system.

Conceptual LINC Runtime Model

Figure 17:
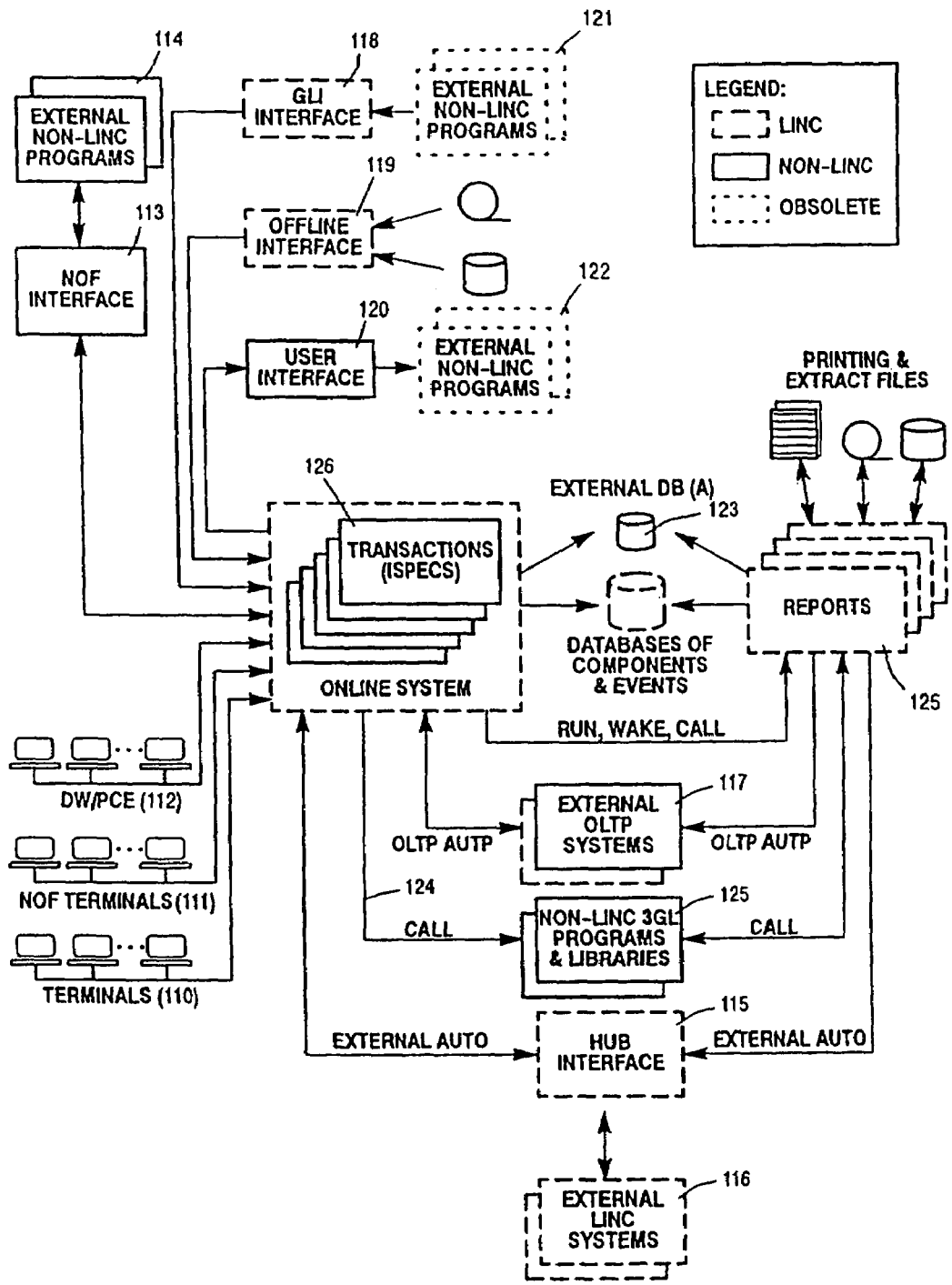
FIG. 17 is a block schematic overview of a LINC run time model.

FIG. 17 shows a conceptual view of a running LINC system and its possible interfaces. It is a conceptual view because it avoids showing any implementation details as these vary between platforms. It is the LINC programmer's view of a running system, containing the entities and interfaces visible from within a LINC system.

Figure 1:
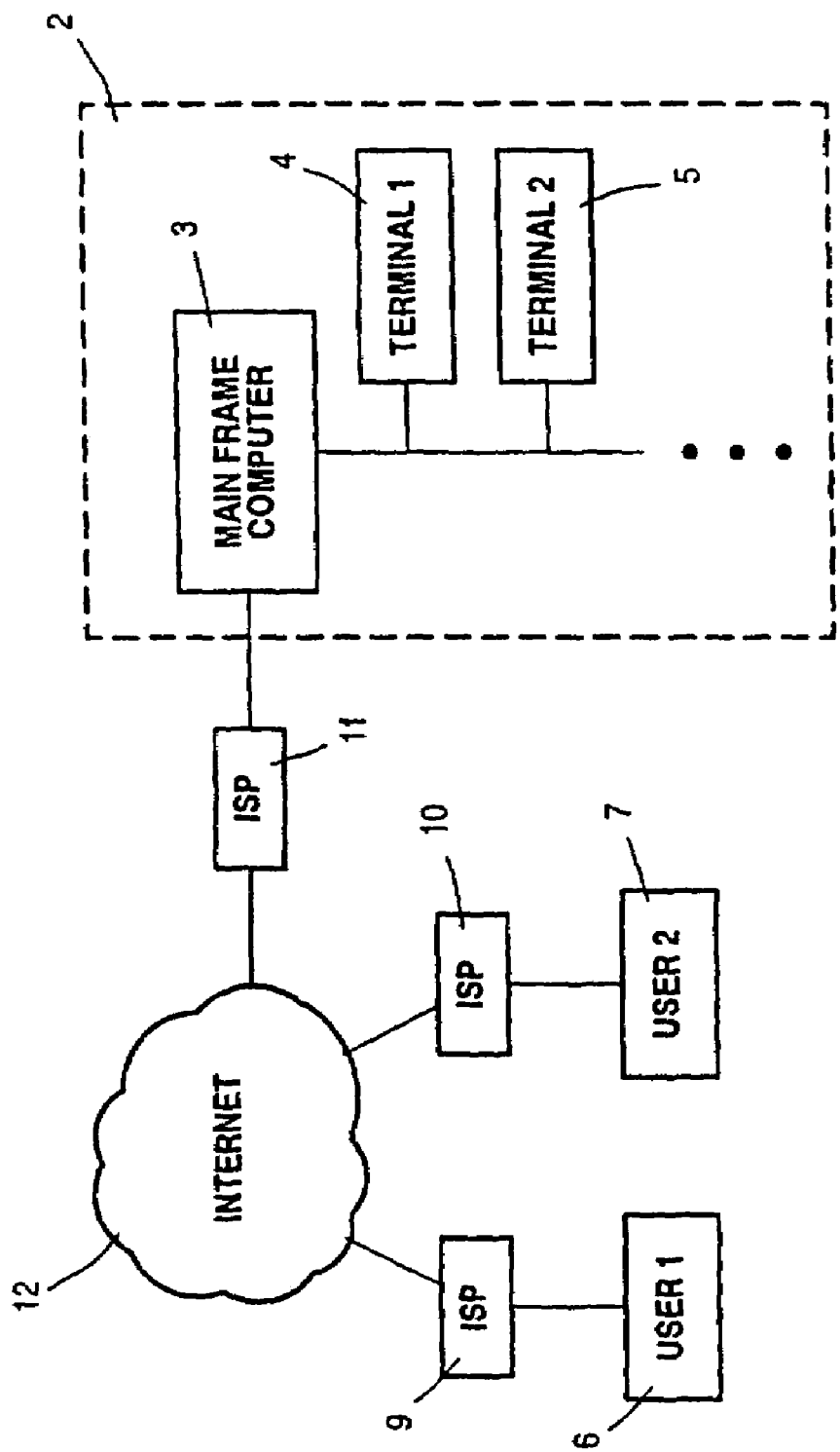
FIG. 1 illustrates a schematically an arrangement for utilizing a mainframe type computer system over the Internet.

FIG. 1 omits showing the various pieces of platform-specific infrastructure such as those that control and manage the running systems and the various utilities. Not all facilities are available on all platforms.

LINC Interfaces

LINC distinguishes between "formatted" and "non-formatted" interfaces. Both forms of interface use defined, fixed format messages for both requests and responses. "Formatted" interfaces include screen layout information in the messages. "Non-formatted" messages do not include any screen layout information. Many of the "non-formatted" interfaces exchange requests and responses using the LINCOFF ISPEC record layouts.

The following interfaces can be used to access the services provided by a LINC online system. Requests coming in from all of these interfaces appear in the same way to LINC applications, as incoming ISPEC requests. Responses are generally returned in the form of ISPEC message at the end of the LINC cycle. Glb.xxxx system data items can be used within application logic to distinguish between the various input sources if necessary.

| | |
|---|---|
| Terminals (110) | This is the traditional path into a LINC system. LINC provides full screen handling functions at run-time for a variety of terminal types. Terminal handling is well supported in both the LINC cycle and LDL language. |
| NOF Terminals (111) | The NOF Terminal interface is intended for "intelligent" terminals that do not need the screen handling facilities provided for normal terminals. NOF "terminals" would commonly be workstation programs that want direct access to LINC services. NOF terminals send and receive "non-formatted" messages. |
| DW/PCE (112) | DW/PCE uses a "non-formatted" interface to provide access to LINC services from GUI screens and VB/PB programs. |
| NOF (113) | NOF is the current interface that external programs should use to access a LINC online system. Using NOF, a non-LINC program (114) can pass transaction request message into a LINC system and receive response messages. The requests and responses are "non-formatted" messages. Some user programming is always necessary to use the NOF interface. This increases the flexibility of the NOF interface at the expenses of programming effort. Skeleton NOF interface programs are supplied to make this programming task easier. |
| Hub (115) | Hub is the standard way for LINC systems to communicate. Hub can be used to exchange ISPEC request and responses between LINC systems running on the same machine or over a network (116). Hub uses a proprietary protocol to exchange "non-formatted" request and response messages. A form of two-phase commit can be used to |

| | -continued |
|---|---|
| | provide some degree of integrity when updating multiple LINC databases from within a single transaction. |
| OLTP(117) | LINC ISPECS can act as Open/OLTP servers, exporting standard X/Open OLTP services. The Open/OLTP interface provides similar functions to Hub but differs in that it uses standard protocols and so is not limited to communicating only with other LINC systems. Open/OLTP also provides two-phase commit to ensure the integrity of distributed updates. |
| GLI (118) | GLI is an obsolete way for external non-LINC programs (121) to access LINC online systems. A customer-written driver program is required to send and receive formatted data, including screen layout information. GLI has been replaced with NOF. |
| Offline (119) | Offline is an obsolete way to process batch transactions in a LINC system. A formatted data file of transactions can be read by the Offline Input Program and sent to the LINC online system for processing. Responses are written to the LINC log. Off line has been replaced by NOF. |

A LINC online system can use the following interfaces to access external resources and applications:

| | |
|---|---|
| NOF (113) | The NOF interface can be used to access external, non-LINC applications. The LINC application uses the external auto mechanism to send requests to the external NOF program and receives responses back in the auto buffer. The external program has to use the NOF message interface. A skeleton NOF interface program is supplied to make it easier to write external NOF programs. The NOF interface is very flexible but requires user programming. |
| Hub (115) | Hub can be used to access other, local or remote, LINC applications. The LINC application uses the external auto mechanism to send request to other LINC systems and receives responses back in the auto buffer. A form of two-phase commit can be used to provide some degree of integrity when multiple LINC databases are updated within a single LINC transaction. |
| OLTP (117) | LINC applications can act as Open/OLTP clients, sending service requests to Open/OLTP applications through the external auto mechanism and receiving responses back in the auto buffer. OLTP offers full two phase commit to ensure the integrity of distributed transactions. OLTP uses standard protocols and can access standard X/Open OLTP servers. |
| User (120) | The User interface is an obsolete way for a LINC application to access external non-LINC system (122). The customer has to provide a User Interface program to handle the communications between the LINC application and the external non-LINC program. "User" has been replaced by NOF. |
| External DB (123) | An A Series LINC application can use the External DB facility to access external databases. The interface can only be used to fetch data from the external databases. |

| | -continued |
|---|---|
| Call (124) | A LINC application can use the Call statement to invoke a library entry point in an external 3GL library or LINC report (125). A single text parameter, GLB.param, is always passed to the external procedure. This restriction often forces users to write interface libraries in order to call external library entry points. |

LINC also provides interfaces into Reports (125). Reports can be started by a Run command from within LINC application code and manually via system or LINC commands. Sleeping reports can be woken by a Wake.up command from within an ISPEC (126). On some platforms it is possible to generate a report as a library. These "LINC Subroutines" can be called from external non-LINC programs and from LINC code using the Call statement.

LINC System Definition and Generation

Figure 18:
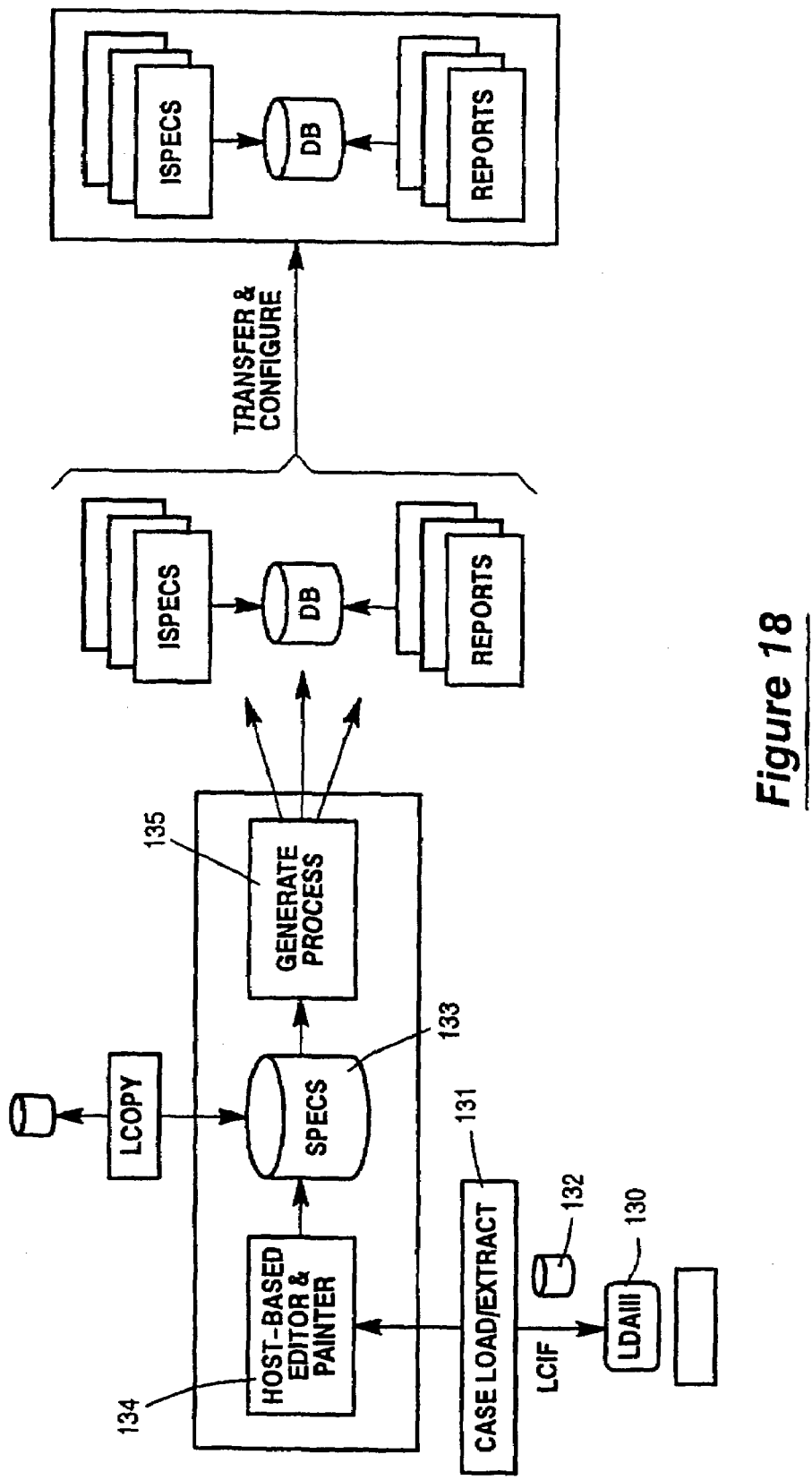
FIG. 18 is a block diagram overview of the simplified LINC generation process.

Currently all LINC systems are generated by the host-based LINC (133) FIG. 18 Development Environment (LDE) from specifications kept in its repository. The specifications (133) FIG. 18 can be entered directly into the repository using the host-based editor and painter (134) or they can be prepared in the PC-based LDA environment (FIG. 18, 130) and loaded in using the CaseLoad utility (131) via an LDE repository in Lcopy format and loaded back in to the same or another host-based repository.

The generate process (135) FIG. 18 takes a specification and determines what compilations and database reorganizations are needed to transform the existing runtime system and its database so that it matches the new specification. Moving from a fully functional version of a system to the next version is fully automated, the user just generates the system and when the generate process is finished, they once again have a fully functional system.

A generated specification can be transferred to another environment without regenerating it again. This facility can be used, for example, to move a system from a test environment into production. These transferred systems can be configured to match their new environment.

LINC Tools and Facilities

LINC also provides a number of tools and facilities. Some of these let the system administrator manage and maintain a running LINC system. Other facilities are used at runtime to supplement system software and provide a necessary functionality. Amongst the tools and other facilities that are provided are:

| | |
|---|---|
| Runtime Control | Allows a system administrator or operator to control a running LINC system. |
| DMU | Platform-specific Database Management Utilities that provide a LINC-oriented interface to the underlying database management tools. The facilities provided vary between platforms but include operations such as initiating garbage collection and changing populations. |
| ROC | The report viewing and printing subsystem. A LINC terminal-based application. |

| | -continued |
|---|---|
| AdHoc | A database query facility providing access to the LINC database using SWL-like queries. LINC-based terminal interface only. |
| Doc | An online documentation facility based around LINC terminals. |
| LINC Log | An optional log of LINC transactions and activities. Can be used by LINC for some forms of recovery, replacing system software. Can also be used for statistical and performance monitoring purposes. |
| LSM | LINC Security Module. An optional security module that can control runtime access to LINC transactions and reports. Can also be used to provide some security for the development environment, restricting what operations can be performed by individual users. |

Tools and facilities are also provided for translating the screens and messages of a LINC system into other languages. Multiple languages can be supported concurrently in a single, running LINC system.

LDA: (FIG. 19)

LDA is the Windows-based GUI development environment for LINC. Users can define and test their LINC specifications in LDA and then transfer them over to the host development environment for generation and deployment into production. The LDA painter supports both a generic text terminal and DW graphic forms. The testing environment includes a debugger, generic text terminal screens and integration with the DW/PCE (Powerclient available from Unisys Corporation) run-time system. All testing is done against PC databases, resources and procedure libraries.

LDA is integrated with DW/PCE. The LDA painter can be used to create the DW/PCE GUI forms directly. These forms can be loaded down into the DW/PCE repository for run-time deployment through the L2D program. Modified DW/PCE forms can be loaded back into LDA by using the D2L program. LDA supports DW/PCE at runtime, allowing the testing of LINC systems that use DW/PCE forms and applications.

Figure 19:
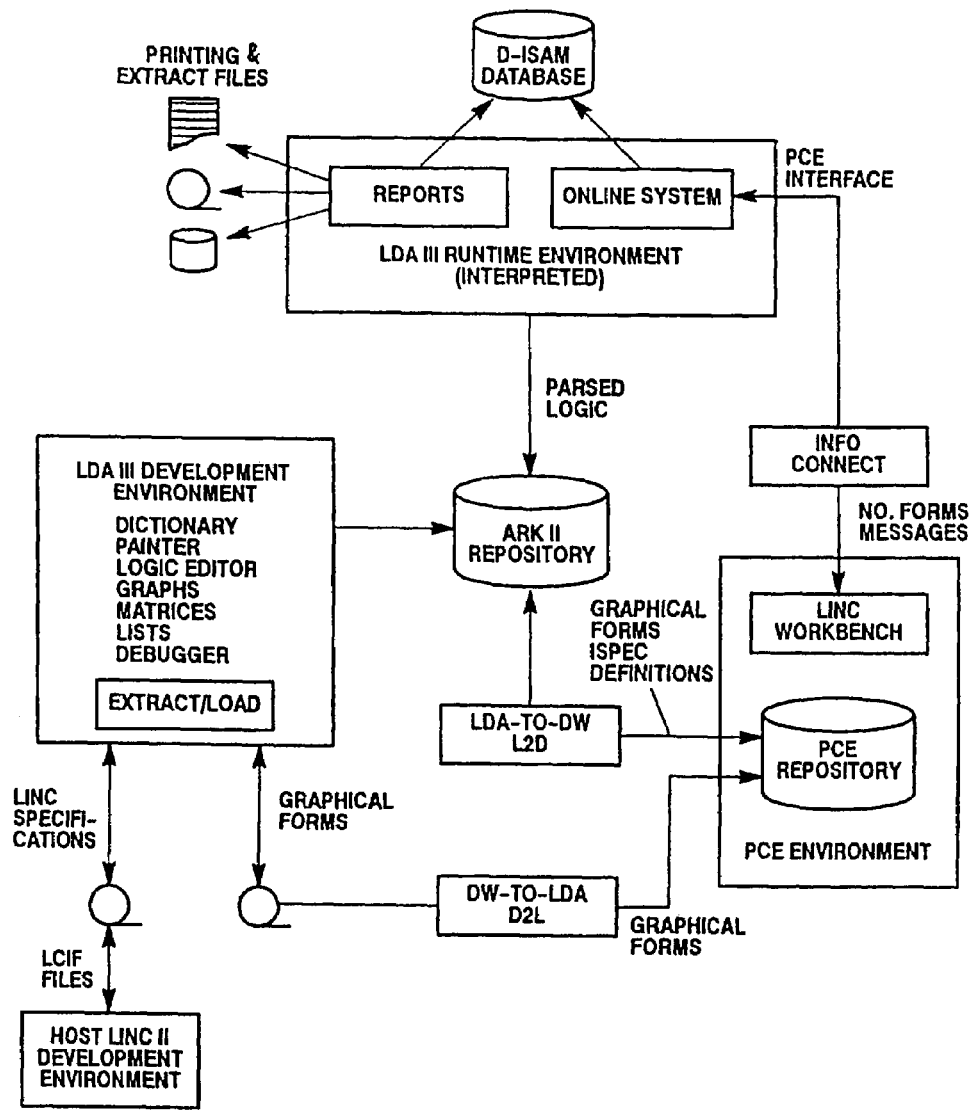
FIG. 19 is a block diagram of LDA, the windows-based GUI development environment for LINC.

FIG. 19 shows the main component of LDA. This diagram is based on versions 1.3 of LDA III.

The preferred embodiment of the present invention will now be described.

In the preferred embodiment, a system is provided for readily extending the utility of a 4GL application into a web environment. The extension is achieved by means of taking the originally defined 4GL application and providing a translator to create a series of codes, the codes being constructed in the language Java. Reference is made to the standard texts such as the Sunsoft Press Java Series of texts for information on the Java language. The codes provide the functionality for interaction with the previously generated 4GL application over the internet. In this manner, internet interaction can be achieved with a previously constructed host application in a substantially simplified and automated manner.

The following description will now be given in relation to an embodiment designed for the LINC System and employing LINC terminology. It should be appreciated, however, that the invention can extend to any 4GL application.

Turning initially to FIG. 1, there is shown an example operational environment in which an application is to run. It is assumed that the application has been previously developed over a traditional mainframe type environment 2 wherein a mainframe computer 3 is interconnected to a series of terminals 4, 5. It is desired to extend the application running on the mainframe or host computer 3 to a internet environment wherein users 6, 7 can utilize a standard browser or the like (such as Microsoft Internet Explorer or Netscape Navigator) to access an application via their Internet service provider 9, 10 over the Internet 12 running on the host computer 3. It will therefore be evident that it will be necessary to take an initial interface specification (Ispec) originally constructed for the application running in the environment 2 and extend the code produced by the compiler of the Ispec so as to operate over the extended environment.

Figure 2:
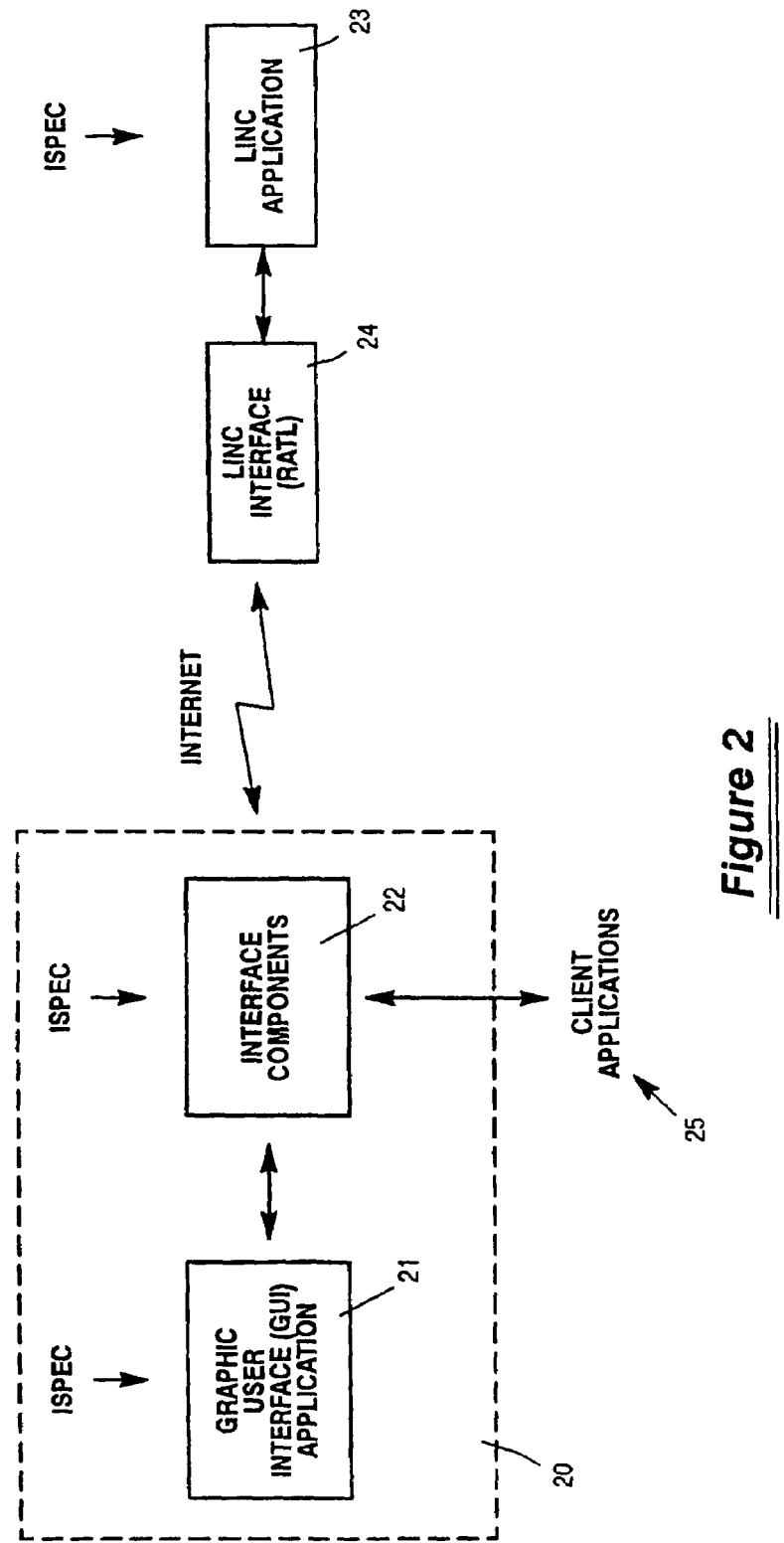
FIG. 2 illustrates the basic arrangement of the preferred embodiment.

Turning to FIG. 2, there is illustrated an overview of the extension in that the Ispec definition is utilized to form a graphical user interface application 21 and interface components 22 which can interact over the Internet with a LINC application 23 running a host mainframe by means of a LINC interface 24. The interface components 22 can preferably also be utilized by other applications running on the client 25 so as to provide for extended capabilities. The automated system for creating the client side application 20 will hereinafter be known as ActiveLINC.

The generated client side 20 of ActiveLINC is preferably written entirely in Java and consists of a runtime environment and generated Ispec components 22 and, optionally, generated GUI interface applications 21. The generated Ispec components can be used as JavaBeans or ActiveX components, so providing access to LINC application from customer-written client applications such as Microsoft Word and Excel. As the Active LINC code is written in Java, it is capable of running on any qualified Java 1.1 platform, including Apple Macintosh, UNIX workstations, Windows PCs, OS/2 PCs and Network Computers.

The client interface components 22 and user interface applications 21 are created by the ActiveLINC generator.

ActiveLINC clients 20 access remote LINC applications 23 on the host side through the use of LINC Interface RATL (Remote Access To LINC) servers. These platform-specific servers 24 provide an open and common way for remote client applications to access LINC applications 23. RATL clients and servers communicate using a RATL protocol running on top of TCP/IP. The RATL protocol can be a simple wrapping of a standardised and extended set of messages that provide all of the functionality needed to support GUI forms.

Each client application can run independently of all other clients, with its own connection back to the application server. Preferably, there are not points of single threading or possible congestion in the transaction path to add overhead and reduce performance. RATL servers can be designed to offer connectivity, throughput and transit times comparable to terminal access on the same host systems. The RATL protocol used between client and application servers only transfers transaction data and responses and adds minimal overhead to each message. Forms and screen layouts in interface 21 can be translated to Java code at code generation time and the compiled code can be loaded to the client only once. Form definitions and layouts are not sent down to the client with every transaction response and there is no run-time interpretation of form layouts.

By creating the ActiveLINC components 22 ActiveLINC client programmers can choose either to write their own client applications, Web pages and scripts using the open component interfaces 22 or to make use of the user interface applications 21 that can be generated automatically from their existing terminal screen and GUI form definitions. These user interface applications 21 can be used as the basis for building customised client applications or used directly to provide GUI form access to LINC applications.

ActiveLINC user interface applications can be generated from a LINC applications' existing form definitions and support all of the features of current LINC GUI forms, such as buttons, fonts, and listboxes.

As the components are Java code fragments, the generated interface applications can be run as either stand-alone Java applications on the desktop or as applets from within a Web browser. Customers can provide immediate Web access to their existing applications simply by using these applets from within a simple Web page supplied by ActiveLINC. An example HTML page can be as follows:

```
<html>
<head>
<title>ACTIVELINC Applet</title>
</head>
<body>
<applet archive="ACTIVELINC.jar"
code="com.unisys.jellybeans.views.ACTIVELINC"
width=0 height=0>
<param name="ViewName" value="Sales">
<param name="Port" value="3333">
</applet>.
</body>
</html>
```

The above HTML page instructs the user's browser to load and run the ActiveLINC applet environment code which then loads and runs the generated user interface code for a "Sales" application. The ActiveLINC code will open up a session with the remote LINC application and the user can work as they have always done with their LINC forms and terminal screens, but now from within a browser and possibly over the Internet.

As is the case with most Java applets, the applet is run within its own browser window and all navigation within the application stays on the same Web page. Moving from one LINC form to another does not involve the Web browser or change the current Web page. Users can move off the ActiveLINC Web page to visit other Web sites and then move back to where they were without closing their session with the LINC application. The session with the LINC application is only closed when the user closes the browser window or logs off.

The generated interface applications preferably fully support the functionality provided by the normal 4GL template graphical user interface forms. One such system, available from the present applicant for constructing user interface forms for LINC applications in known generally as the PowerClient system (Trade Mark).

Figure 3:
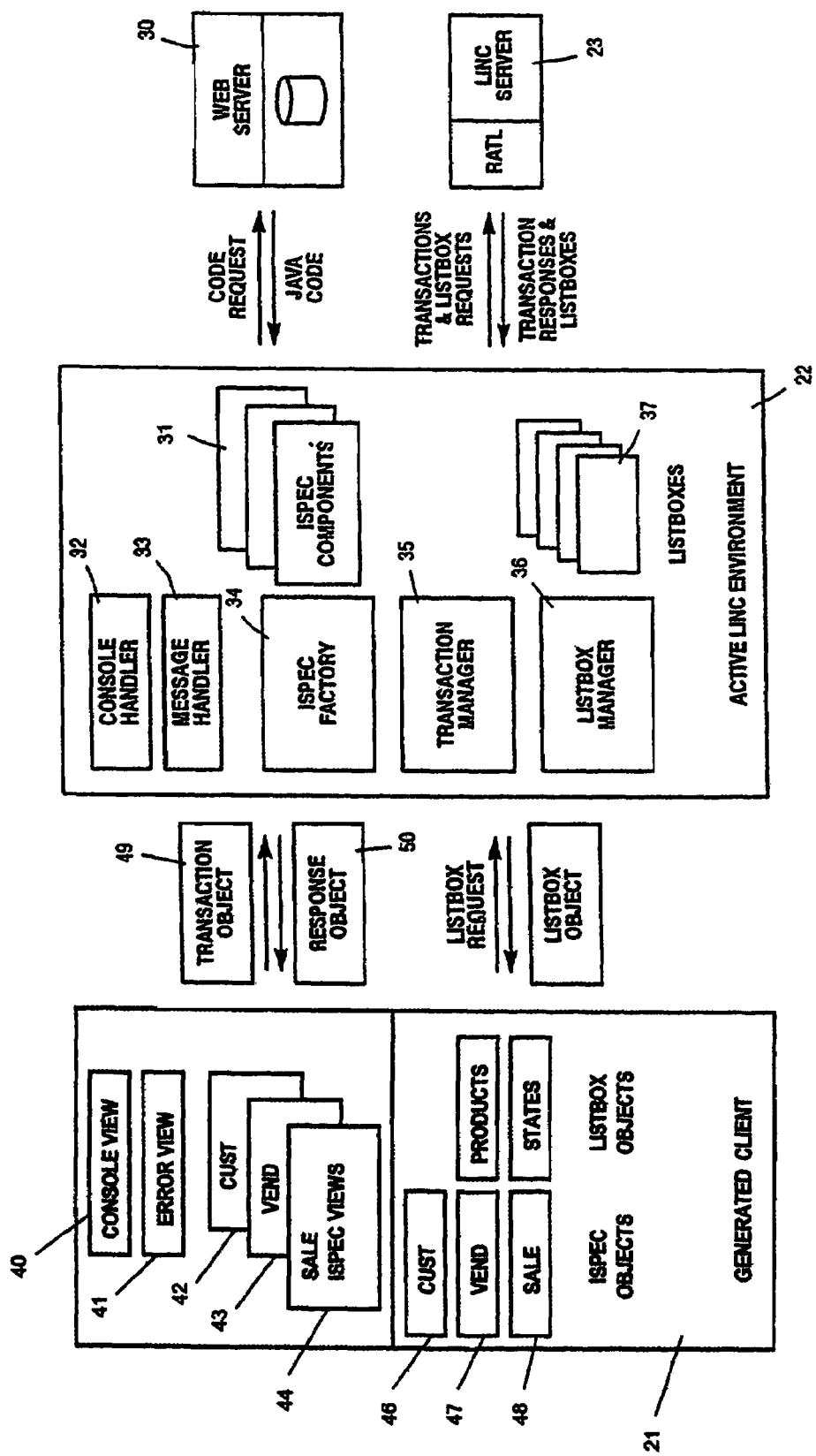
FIG. 3 illustrates a schematic layout of the preferred embodiment in more detail.

Turning now to FIG. 3, there is illustrated an example ActiveLINC application in more detail. The user interface 21 and interface components 22 are initially stored on a web server 30 and are utilized on demand as is the normal case of Java applets loaded via a browser. The interface components 22 interact with a LINC application 23 and include components 31 for handling Ispec requests in addition to a console handler 32 dealing with console requests, a message handler 33 for dealing with messages, an "Ispec factory" 34 for handling Ispec updates, a transaction manager 35 for dealing with an overall transaction and a list box manager 36 for dealing with an overall transaction and a list box manager 36 for handling list boxes 37. The interface components 22 are utilized by a created graphical user interface application 21 which can include separate views for a console view 40, an error view window 41 for handling error messages, a series of Ispec views 42-44 corresponding to various screen views for customer, in addition to a number of corresponding Ispec objects 46-48 which can comprise data objects for forwarding to interface components manager 22.

Users can submit LINC commands, such as requests to run reports, through a console window 40. Responses to these commands come back to this window as well. Errors generated from transactions are displayed in a separate error window 41. The console and error windows are separate from the form windows and can be re-sized or minimised independently. The main ActiveLINC form window has several pull-down menus, including support for navigation and form help.

ActiveLINC interface applications are built using a common framework program and a set of generated Ispec view components 42-44. Each GUI form in an Ispec is translated into a separate JavaBean view component that is dynamically loaded from a webserver 30 when required using the standard Java class loader. These Ispec view components just display their form and save user input in a corresponding Ispec object 46-48. The Ispec objects are passed on to the LINC Environment's transaction manager 35 for sending on to the remote LINC application 23 for processing. The framework can then take the Ispec object coming back from the LINC application and invokes the appropriate Ispec view component to display the response form and data.

The generated interface applications can be used directly or modified to create customised client applications. Further simple changes to the user interface, such as adding backgrounds, navigation buttons and links can be done without writing any Java code. This type of change can be done entirely through the HTML Web page that invokes the ActiveLINC applet. Some logic changes can also be implemented without modifying the generated Java code through the use of inheritance and events. The Ispec components 31 support events on all of the Ispec fields, transaction submission and receiving responses. Users can therefore write their own event handling code and register it to be called when necessary. Using this mechanism it is possible to include logic such as field validation without altering the generated Java code at all. Users can also take the generated Java code and alter it to include their own logic but they could also use any of the modern Java application building tools and the ActiveLINC component interface to write their own GUI applications. In many cases, users may choose to avoid writing Java code altogether and instead use generated scripted HTML pages for their user interfaces.

It will therefore be evident ActiveLINC takes LINC Ispec interface definitions and builds JavaBeans components for use in client application programs. These components are Java classes and are used to create local proxy Ispec objects eg. 46-48 that send on transaction requests 49 to remote LINC application servers. Client applications 21 see the LINC application 23 as a set of transaction services accessed through component interfaces 22, following the programming model expected of a transaction-oriented applications on say a Microsoft platform.

ActiveLINC application programs 21 use the component class definitions to create local Ispec objects eg. 46-48. These proxy Ispec objects export methods to get and set values, submit transactions and examine transaction results. They also export events that applications can use to detect when field values have been changed or when new Ispec data arrives from a LINC application.

Figure 4:
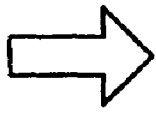
FIG. 4 illustrates a simple mapping of Ispec input to Ispec components.

FIG. 4 shows a MakeSale Ispec 55 and the corresponding generated Ispec components 56. This Ispec takes a customer number, a product and a sale amount and registers the sale within the LINC system. ActiveLINC takes this Ispec interface definition and builds the corresponding Ispec component class. This component can be used to make instances of MakeSale Ispec objects in application programs and scripts.

Figure 5:
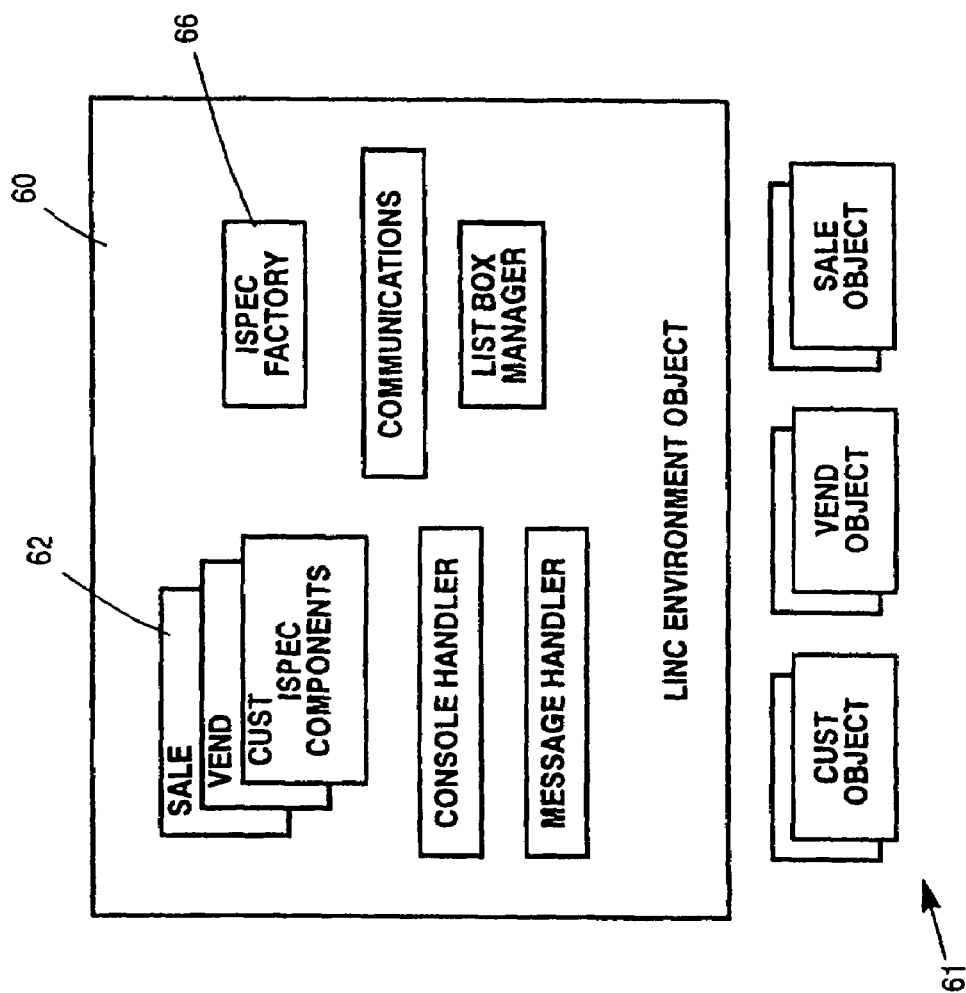
FIG. 5 illustrates the structure of a LINC environment object.

Examining the component interface in more detail ActiveLINC client applications access the remote LINC application through a set of objects. As illustrated in FIG. 5, the primary object is the LINC Environment's object 60 which represents a connection to a remote LINC application. This object is used to create Ispec objects e.g. 61 from the generated Ispec components 62 and to handle the exchange of transaction requests and responses with the remote LINC application. Client applications can have multiple LINC Environment objects, giving them concurrent access to multiple LINC applications, possibly running on different host systems.

The ActiveLINC programming interface is an object-based interface. Clients build up transaction requests by creating an Ispec object 61 and setting its field values through calling on its 'set' methods. An example code fragment for creating objects and setting values is illustrated in FIG. 6. The transaction is sent to the LINC application by passing the completed Ispec object to the LINC environment object by means of a 'transaction request'. Transaction responses come back to the client as new or refreshed Ispec objects. Listboxes that arrive from the LINC application server can be saved as listbox objects that are managed by the LINC environment and accessed through its listbox methods.

The definition of the ActiveLINC programming interface includes both the objects and the methods they export. In some cases two sets of methods can be provided to perform much the same task. One set is designed to provide simple access from scripting languages while the other exposes the full power and complexity of the LINC application interface for use by client programs.

The LINC Environment object of FIG. 5 contains an 'Ispec factory' 66 that creates Ispec objects 61 from the generated Ispec components 62. Client applications create local Ispec objects 61 by calling on the Ispec factory method ('getIspec') in the LINC Environment and getting back a new, initialised Ispec object.

Ispec objects can be defined with all the usage input, usage input/output and usage inquiry fields from the corresponding LINC Ispec as their data items ('properties'). Methods are exported from the Ispec object to set and get the values of these properties. Two types of get/set methods are available: generic methods where the programmer supplies the name of the field as a parameter to the call; and a set of more conventional property-like methods that are generated specifically for each field. The Ispec object code can do basic validity checking when values are stored into a data item, such as checking that numeric fields only contain valid numbers. Alternative versions of ActiveLINC can move more validation code from the Ispec into the generated component code, such as range and date checking. The ActiveLINC interface also defines two events that are invoked every time a field value changes. These events can be used to invoke user-supplied validation code. This technique can be used to add field validation logic to generated user interface applications without modifying-them at all.

Client applications submit transactions to a remote LINC application by setting values in local Ispec objects and passing them to either one of the two 'transaction' methods exported from the LINC Environment. The 'simpleTransaction' method sends off the transaction and returns the response in the same Ispec object. This method is meant for the simple case where the remote LINC application is providing a set of pure services. The alternative transaction method, 'transaction', takes an Ispec object and returns a new object, possibly of a different Ispec type. This method is intended for use with existing 'navigational' LINC applications that control the sequence of screens presented to the user by recalling different Ispecs in their logic.

An event, 'startTransaction', is triggered before a transaction is sent off to the LINC application and can be used to provide transaction-level data integrity checking. The transaction calls are synchronous but with timeouts. The failure of a LINC application to respond within the timeout period is regarded as a failure and an error code is returned from the transaction call.

The following example of a script establishing a LINC Environment and submitting transaction shows most of the interface features just discussed.

'create LINC client-side environment objects linc=new LINCEnvironment("Demo", "com.mycompany", "Sales", "public");

status=makeLINCStatus( );

connect to the application server linc.connect("ratl:linchost.mycompany.com:3333", "SALES");

'log on to the application server linc.login(who, password);

linc.hello( );

'create Ispec object

SaleIspec=linc.getIspec("MakeSale");

do

'gather data for next sale and set fields in Ispec object

Get_next_sale;

SaleIspec.setFieldValue("customer", cust_no)

SaleIspec.setFieldValue("product", prod_no)

SaleIspec.setFieldValue("amount", sale_amount)

'submit sale transaction success=linc.simpleTransaction(SaleIspec, status);

if success=OK then . . .

loop

Both transaction methods submit the Ispec transaction to the LINC application server and wait for a transaction response. Errors and the status line are returned in the LINC-Status passed in the transaction call.

Methods provided by the LINC Environment can include support for list boxes, operator messages and console commands and responses. Incoming list box data is stored in list box objects that can be accessed by name from client applications.

Everything needed to support GUI for access to LINC applications is provided by the LINC Environment and Ispec components and the generated interface applications use all of this functionality. Client applications can choose to use just the simplest interface methods or they can take full advantage of list boxes and consoles for running reports and existing navigational logic in their LINC application.

Introspection is supported by both special ActiveLINC methods and by the normal facilities provided by the Java-Beans and ActiveX component architectures. The ActiveLINC methods support finding out all the Ispecs defined within a Profile and the fields and their properties for each defined Ispec.

The following tables describe some of the more important objects and methods:

LINCEnvironment Object

1. LINC Environment (environmentName, packagePrefix, appName, profileName)

This constructor returns a LINC environment object, ready for connection to the specified application. The packagePrefix, appName and profileName parameters define the location of the Java class files. The environmentName parameter just names the LINCEnvironment object.

2. Connect (hostURL, viewName)

Connect the LINCEnvironment to a LINC application server. The URL supplies the name of the application server and the TCP/IP port number. The viewName is the name of the application view within the RATL server. A form of Connect is supplied that returns a loginAttributeArray object for those cases where complex login is required.

3. Autologin (Username, Password)

Login to the server using the supplied username and password. The more complex login method is available to handle additional types of verification data and makes use of the LoginAttributeArray that can be passed back from a RATL server on a Connect request.

4. Hello (IspecModelReference)

Sends a EH message to the LINC application and returns a reference to a Fireup Ispec object if one is returned from the server.

5. getIspec (IspecName) Returns IspecModel

Create an instance of an Ispec, loading the class of the Ispec if necessary.

6. getIspecList Returns Array of String

Returns the names of the Ispecs defined within a Profile/LINC Environment as an array of strings.

7. simpleTransaction (Ispec, LINCStatus) Returns Success

Turns the Ispec object into a record and sends to the LINC application for processing. The Ispec returned in response has to be of the same Ispec type and the data is returned in the same Ispec object. Transaction requests can succeed, succeed with errors or fail. These possibilities are reflected in the return value of this method. Errors and the status line are returned in the LINCStatus object passed to the transaction method.

8. Transaction (Ispec, newIspecReference, LINCStatus) Returns Success

Sends the Ispec object to the LINC application for processing after turning it into a record. Returns a new IspecModel object that holds the result of the transaction.

9. Event TransactionEvent

This event is caused when a transaction is about to be sent off to the LINC application. Client applications can attach to this event to perform data validation on the Ispec object before it is sent off for processing. 'TransactionEvent' is a vetoable event and so can be used to stop the transaction from being sent by raising a TransactionVetoedException.

List Objects 1. getList (listName) Returns listModel

Returns a named list as a listModel object. If the list is not in the Listbox manager's cache it will request it from the LINC application server.

2. getItem (itemNo) Returns listItem

Returns a listItem object from a list. ListItems: represent a single item from a list and support method calls to return their data fields.

Ispec Objects

Ispec data fields are kept as LINCField objects. Methods are available on these objects to retrieve the value of the field and information about it, such as its length, name and type.

1. getFieldValue (fieldName) Returns LINCField

Returns the value of a named field from the Ispec e.g. getFieldName("PROD"). Ispec objects also can have generated get methods such as getPRODValue.

2. setFieldValue (fieldName, LINCField)

Sets the value into the named field in the Ispec e.g. setFieldNwne("PROD", prodCode). Ispec objects also can have generated get methods such as setPRODValue.

3. getFields Returns Array of String returns the names of the fields defined in the Ispec, excluding copy.from fields, as an array of strings. Methods are available to find the properties of each of these named fields, such as type and length. The names of copy.from fields can be fetched by using getArrayColumnNames which returns an array of strings. The number of copy.from rows and columns can also be obtained by calling the appropriate introspection methods (getArrayRows and getArrayCols).

4. Events VetoableChange and PropertyChange

These events are triggered when the value of a field within the Ispec is changed. Clients can register event handling procedures that will be called whenever the event is raised. The procedures are passed the name of the field and its old and new values. Procedures registered with the VetoableChange event can raise an exception, so stopping the change from taking place. There are methods on the LINCEnvironment that allow property change event listeners to be registered for the Ispec and so automatically attached to every new instance of the Ispec object that is created.

User hooks are provided at several places in the transaction flow as noted above. Users can use these events and call back procedures to have their own code invoked at critical times. The property change and transaction events provide support for validity checking. These hooks are supported without requiring any changes to the generated client code and so do not need to be recompiled on every ActiveLINC generate.

LINCStatus Objects

Errors and status from transaction requests, and other host requests, is passed back in a LINCStatus object. These objects have methods to determine the number of errors and retrieve error and status text.

1. getStatus Returns String

Returns the status line returned by the application.

2. getErrorCount Returns errorCount

Returns the number of errors returned in response to a transaction request 3. getError(errorNo) Returns String Returns the error text for error number errorNo.

Similar object structures can be used for any 4GL legacy application.

The generator can proceed by getting the requested Ispecs from the repository, generating the appropriate Java source code for the components and interface applications, compiling the Java source and placing the compiled code in the requested destination directory. A user-specified batch file can also be invoked at the end of the generate process to handle tasks such as the deployment of generated code.

The ActiveLINC generate process will now be described. In the present embodiment, ActiveLINC is a tool kit, rather than being fully integrated with either host-base LINC development or LDA.

Figure 15:
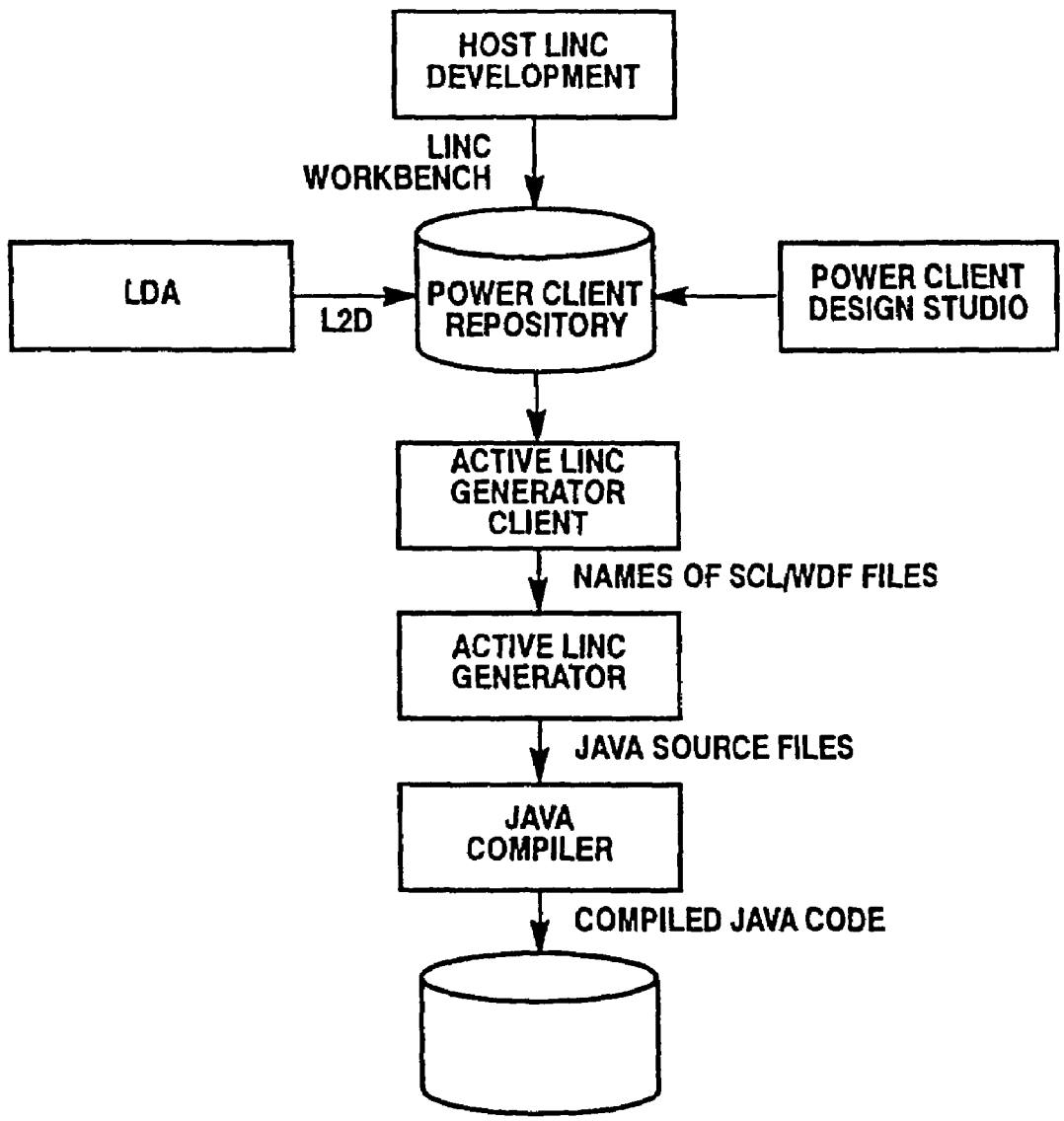
FIG. 15 is a block diagram illustrating the ActiveLINC generation process.
Figure 16:
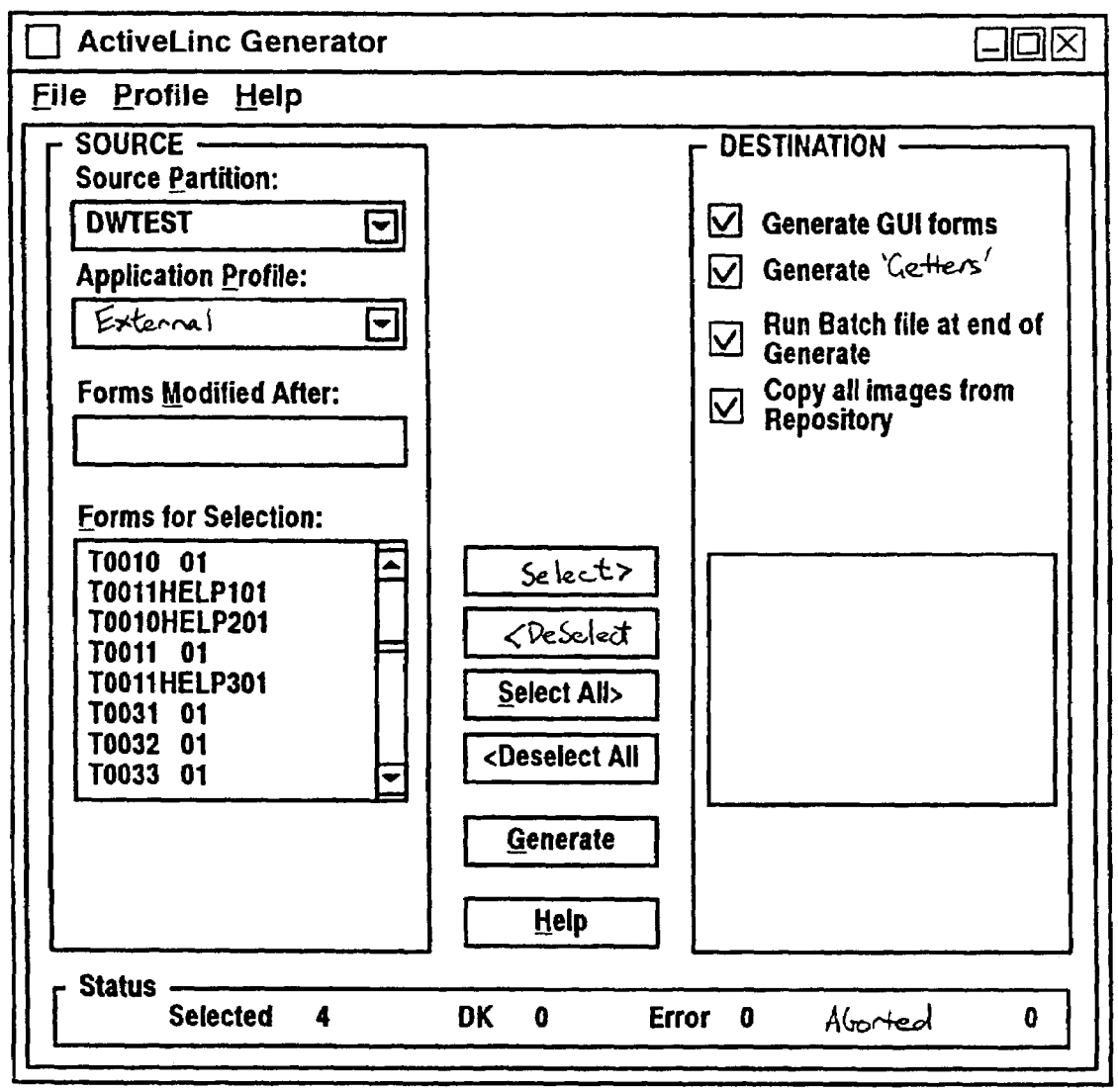
FIG. 16 is an example generated client GUI interface.

Referring to FIGS. 15 and 16 the tool kit is made up of an ActiveLINC generator and the precompiled Java code files for the LINCEnvironment classes. The generator takes Ispec interface and GUI form definitions and produces compiled Java source files for the interface components and applications. The generation process is controlled from the ActiveLINC Generator Client.

The second release of ActiveLINC is planned to be fully integrated with LDA. LINC developers will be able to define their client profiles, generate ActiveLINC clients and components, test them and finally deploy them, all within LDA.

The ActiveLINC generator uses the PowerClient run-time repository as a common source of Ispec interface definitions and GUI forms. The following table shows how forms and definitions get into the repository from various sources.

| | |
|---|---|
| Host-based screens | Defined using screen painter in LINC Interactive. Host generate LINC applications with PowerClient/DW flag set. Creates SCL forms based on screen definitions and loads them into the VrDP form repository. Run the LINC Workbench to download SCL/WDP files from VYIDP repository to PowerClient repository on PC. |
| PowerClient forms on host | Defined using PowerClient painter and up-loaded to host WDP repository. Run the LINC Workbench to download SCL/WDP files from VirDP repository to PowerClient repository on PC. |
| PowerClient forms on PC | Defined using PowerClient painter and left in thePowerClient repository on the PC. |
| Forms in LDA | Defined using LDA forms painter. Run the L2D utility to load SCL/WDF definitions into the PowerClient repository. |

The LINC developer can define sets of Ispecs as ActiveLINC Bundles. Users may define more than one Bundle for a single LINC application, each one suited to the needs of a specific set of users. One set of GUI interfaces can be generated for a few selected Ispecs that are to be made available for public access over the Internet, while another, different, set of Ispecs can be made available through component access for local client applications. These client-side Bundles just control the generation of ActiveLINC components and interface applications and are not a security mechanism. Access restrictions can be enforced through the use of RATL Views and LSM on the application servers.

The ActiveLINC Generator GUI Client provides support for the persistent definition of Bundles and for the generation of Java code from the Ispecs making up these Bundles. Users can generate code for all Ispecs within a Bundle, for just selected Ispecs from the Bundle or for just those Ispecs that were updated since a specified date. The generator gets the requested Ispecs from the repository, generates the appropriate Java source code for the components and interface applications, compiles it and places the compiled code in the requested destination directory. A user-specified batch file can also be invoked at the end of the generate process to handle tasks such as the deployment of generated code. ActiveLINC release 1 may also support the automatic generation of all Ispecs that have been updated since the previous generate but this is a low priority feature and may not make the first release.

The ActiveLINC generate process creates a separate JavaBean component for each selected Ispec. The methods and events exported from these components form the basic ActiveLINC Client API for accessing LINC applications running on remote servers. As an extension the code generated for these components could also include validation logic and clientside methods defined in the Ispec, carrying forward the traditional LINC strength of defining the behaviour of a system in just one place and ensuring total system integrity through every change. The ActiveLINC interface applications discussed earlier are built using these components and all the features needed to support modern GUI applications are provided in the component programming interface. The user interface applications themselves can be actually quite simple programs, just providing form and field display functions, and rely on the component interfaces for most of their functionality. Client programs can also be written in the same way, focusing just on the user interface and using the component interface to invoke LINC applications for transaction logic, business rules and database access.

The ActiveLINC generate process preferably creates and compiles Java code only for those Ispecs requested by a developer. The Java code for Ispecs that are not selected for a generate is not re-compiled and so timestamps on the code are not changed, so keeping any cached copies current and avoiding unnecessary downloads.

RATL Servers

As noted previously ActiveLINC client programs use RATL (Remote Access To LINC) servers to access their host-based applications. Client applications invoke LINC Environment objects to establish a TCP/IP connections to remote RATL servers and thence to LINC applications. The RATL servers take transaction requests from client programs over a TCP/IP connection and pass them to the application. Transaction responses from applications are then passed back to the clients over the same TCP/IP connection. RATL servers can also pass back asynchronous messages, such as messages from reports, to a client application.

RATL servers can be designed to be scalable and to offer high performance. No real limits are placed on the number of concurrent sessions supported and the response time for ActiveLINC transactions is at least as good as current terminal response times, possibly better as no screen formatting data is sent back with each response.

ActiveLINC clients establish normal sessions with LINC applications through the RATL servers. LINC applications generally do not need to be changed before they can be accessed by ActiveLINC client applications or the generated user interface programs. The only exceptions are applications that rely on fixed station names or numbers to maintain state between stations or for security checks. Current RATL servers can dynamically allocate sessions and stations to incoming ActiveLINC client connections, although client applications can request a specific station name when they connect to the RATL server. This assists any LINC applications that maintain data across sessions but does not help in establishing access rights based on station name. Applications that rely on station-based security and access checks will need to be changed as station names supplied by client applications cannot be trusted.

RATL clients, such as ActiveLINC programs, can control the setting of LINC GLI3.GUI and GLB.STYLE flags to ensure compatibility and to distinguish ActiveLINC clients where necessary. ActiveLINC clients can masquerade as PowerClient stations (GL13.GUI='Y' and GLB.STYLE='NOFORMS'), as traditional NOF programs (GLB.GUI='N' and GLB.STYLE='NOFORMS') or can establish their real identity (GLB.GUI='N' and GLB.STYLE='ActiveLINC'). This last setting supports LINC applications that need to perform different logic when handling. ActiveLINC clients.

Sessions are established by calling on the Connect methods exported from a LINC Environment object and are closed when the client deletes the LINC Environment object. Clients can establish multiple concurrent sessions, possibly with multiple hosts, just through using multiple LINC Environment objects. Each session can be used to serially access multiple LINC applications through the use of the LDL Switch.to command. A Switch.to command results in a different destination LINC application for the session.

Clients and RATL servers communicate using the simple RATL protocol. The RATL protocol is based around NOF messages, with a few extensions for establishing sessions and downloading objects such as listboxes and images. In most RATL protocol exchanges, the client sends a message and the server sends the replies from the LINC application. The protocol also allows unsolicited messages to be sent from the server, such as display output from reports and operator messages.

Figure 7:
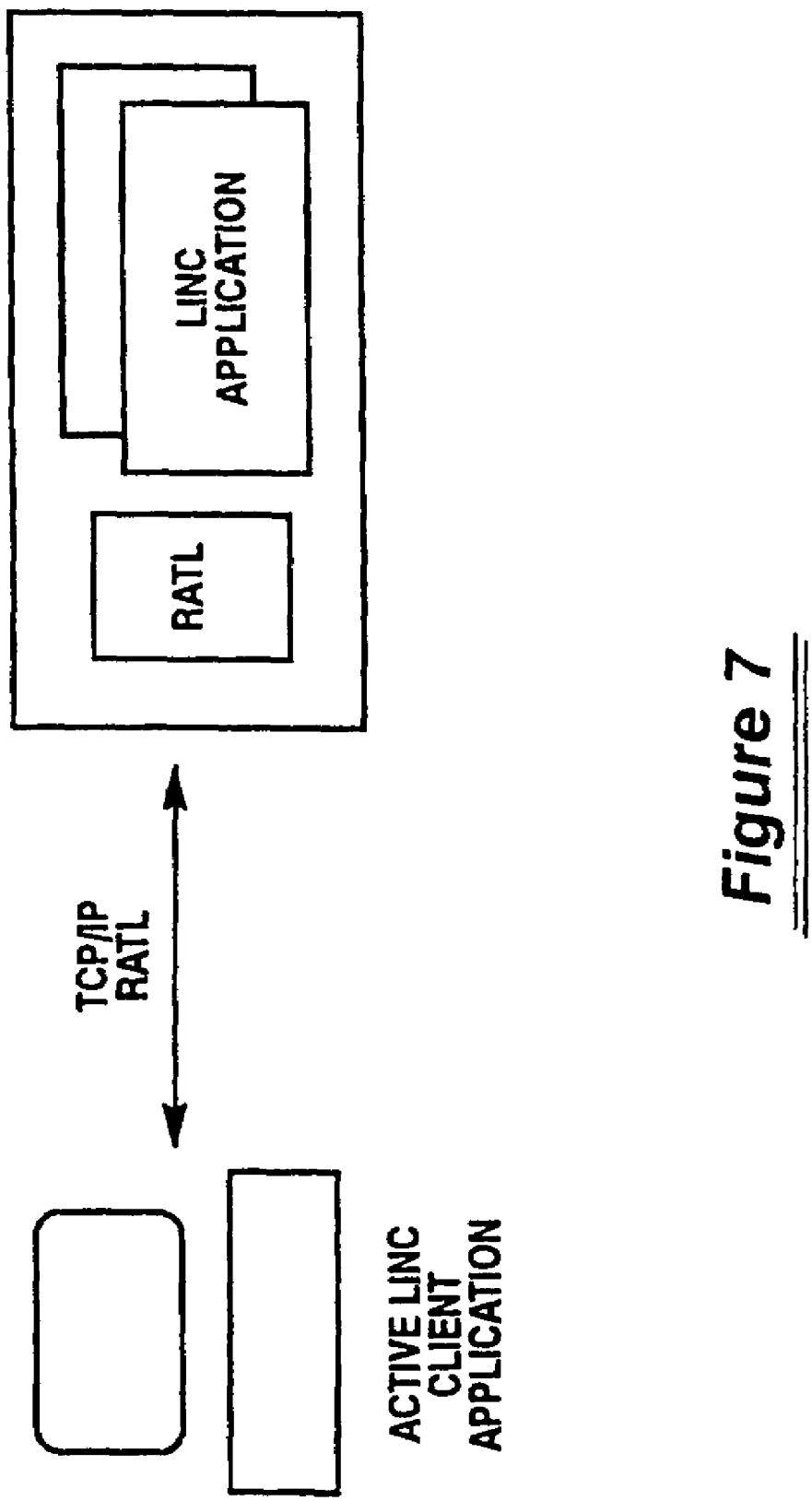
FIG. 7 illustrates the form of a non-web direct connection.

Regardless of the setting of the GLB.GUI and GLB.STYLE flags, all RATL clients can make use of the extensions to standard NOF As noted previously, each ActiveLINC client application opens a TCP/IP connection to the host running the RATL server and the LINC applications. This connection is direct where possible, avoiding any overhead or possible points of congestion. FIG. 7 shows the basic direct connection between an ActiveLINC client application and a remote LINC application.

Figure 8:
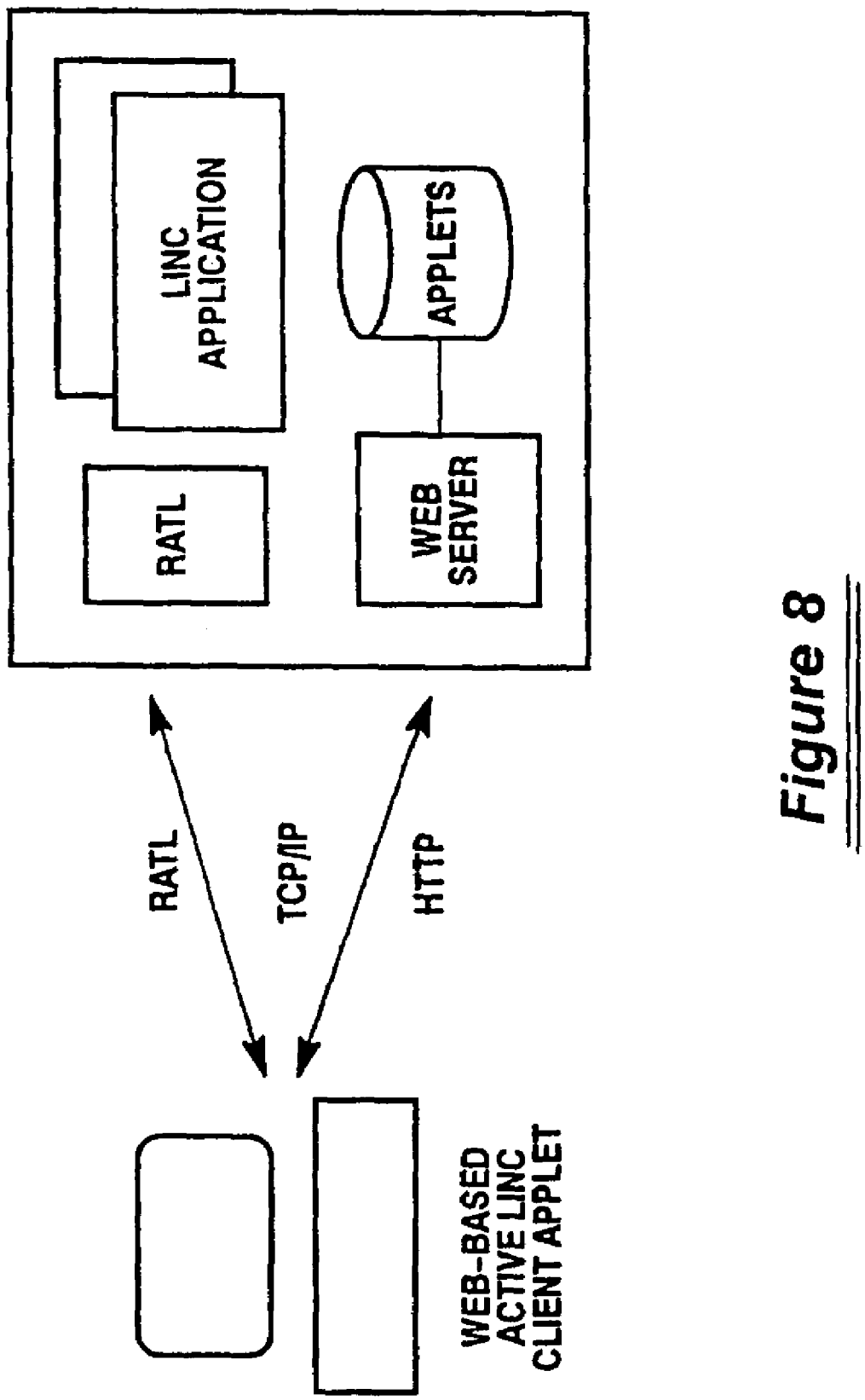
FIG. 8 illustrates schematically the format of a web based direct connection.

ActiveLINC client applications that are run as Java applets from a Web browser may not always be able to make a direct connection back to the LINC application server because of standard Java web security constraints. The security constraints may be such that the Java applets may only open TCP/IP connections back to the Web server from where the applets were themselves loaded. This is not a problem if the Web server providing the applets and the LINC application are running on the same system. FIG. 8 shows an ActiveLINC client applet running from a Web browser and accessing a remote LINC application. In this case the Web server is running on the same system as the RATL server and LINC applications. This configuration is possible with Windows NT and UNIX systems, and with the Unisys WebTS and Atlas Web servers running on ClearPath systems. A variant on this configuration would be to have restricted Web servers running on the LINC application servers that just supply the ActiveLINC applets. This would both support load partitioning and make system maintenance easier as all the generated LINC and ActiveLINC code could be loaded onto the same system.

Figure 9:
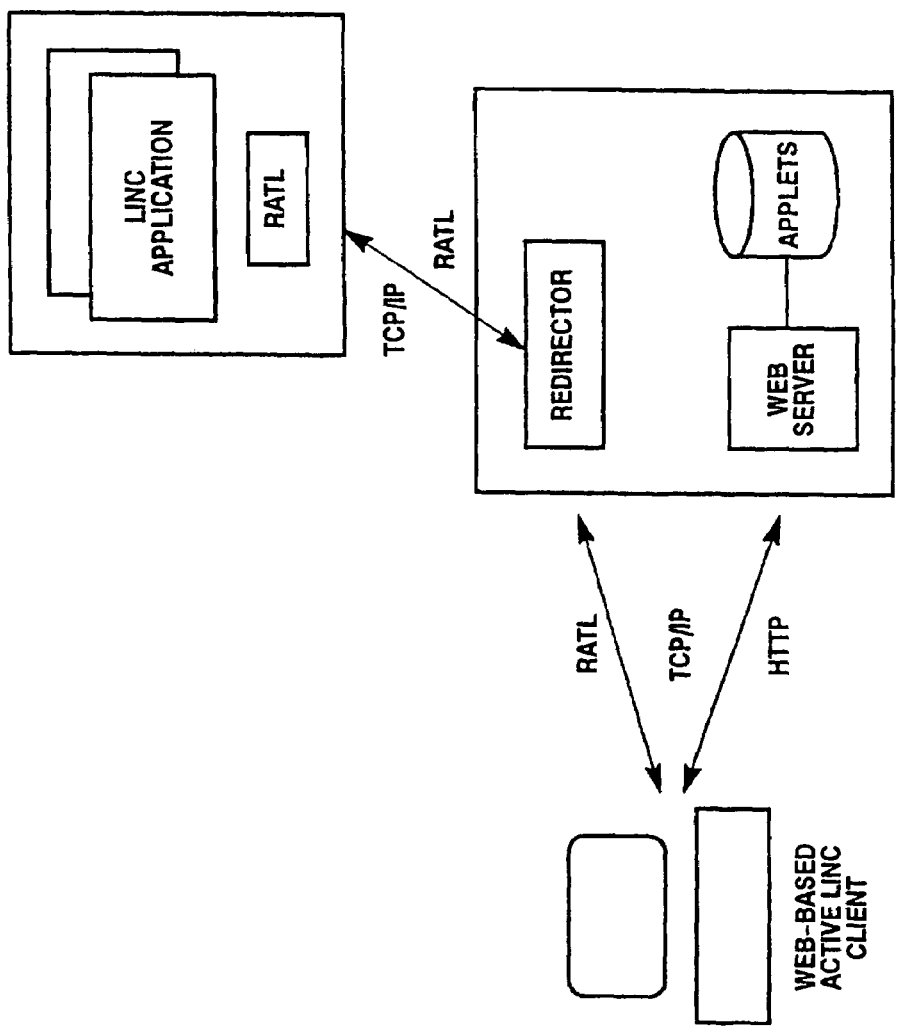
FIG. 9 illustrates the utilization of a web connection having a re-director.

If the LINC application and the Web server supplying the client applets are running on different systems, then the connection has to pass through a small redirector program on the applet Web server. This redirector accepts messages from the ActiveLINC client, passes them through to the LINC application server and then passes responses back. This redirector code can be constructed to be fast, just reading and writing messages, and should not normally be a cause of performance problems or bottlenecks. FIG. 9 shows a typical configuration with a separate Web server and LINC application server. This configuration also offers enhanced security and isolation of the application servers. The Web server system may be available through the public Internet but the critical LINC application server can be kept isolated and secure. The LINC application server can be on a local private network or corporate Intranet while still allowing controlled public access to the LINC application through the redirector.

Figure 10:
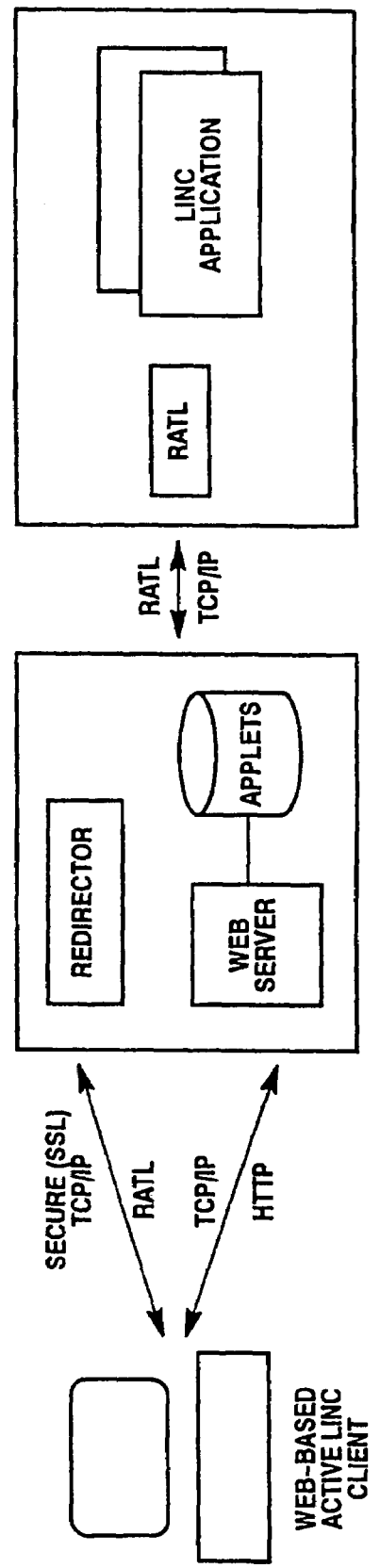
FIG. 10 illustrates the utilization of secure access via a re-director service.

ActiveLINC clients and RATL servers normally exchange unencrypted messages that are susceptible to eavesdropping, especially over a public network. Secure communications is possible through use of 'secure sockets' (SSL) instead of standard TCP/IP connections between ActiveLINC clients and the application servers. SSI, is not yet available on MCP and OS2200 systems but secure data transport can still be provided through the use of a redirector as shown in FIG. 10. Connections can be used between the ActiveLINC client and an SSL-capable Web server and normal TCP/IP is used to connect to the application servers over a physically secure local network.

As mentioned earlier, the only networking protocol initially supported is TCP/IP. These direct TCP/IP connections offer good performance but may run into problems with corporate firewalls as these are often configured to block access to most TCP/IP ports. Users can solve this problem immediately by using a Web server technology such as Active Server Pages and distributing pure HTML to client browsers.

ActiveLINC can supports many ways of enabling access to LINC applications from Web browsers. The simplest way is to run the generated sample interface applications as applets from a Web browser. More complex and dynamic Web pages can obviously be built by using scripting languages and ActiveLINC component interfaces to access remote LINC applications. Web servers can use server-side scripting and ActiveLINC components to dynamically build Web pages that include live data from LINC applications.

Figure 11:
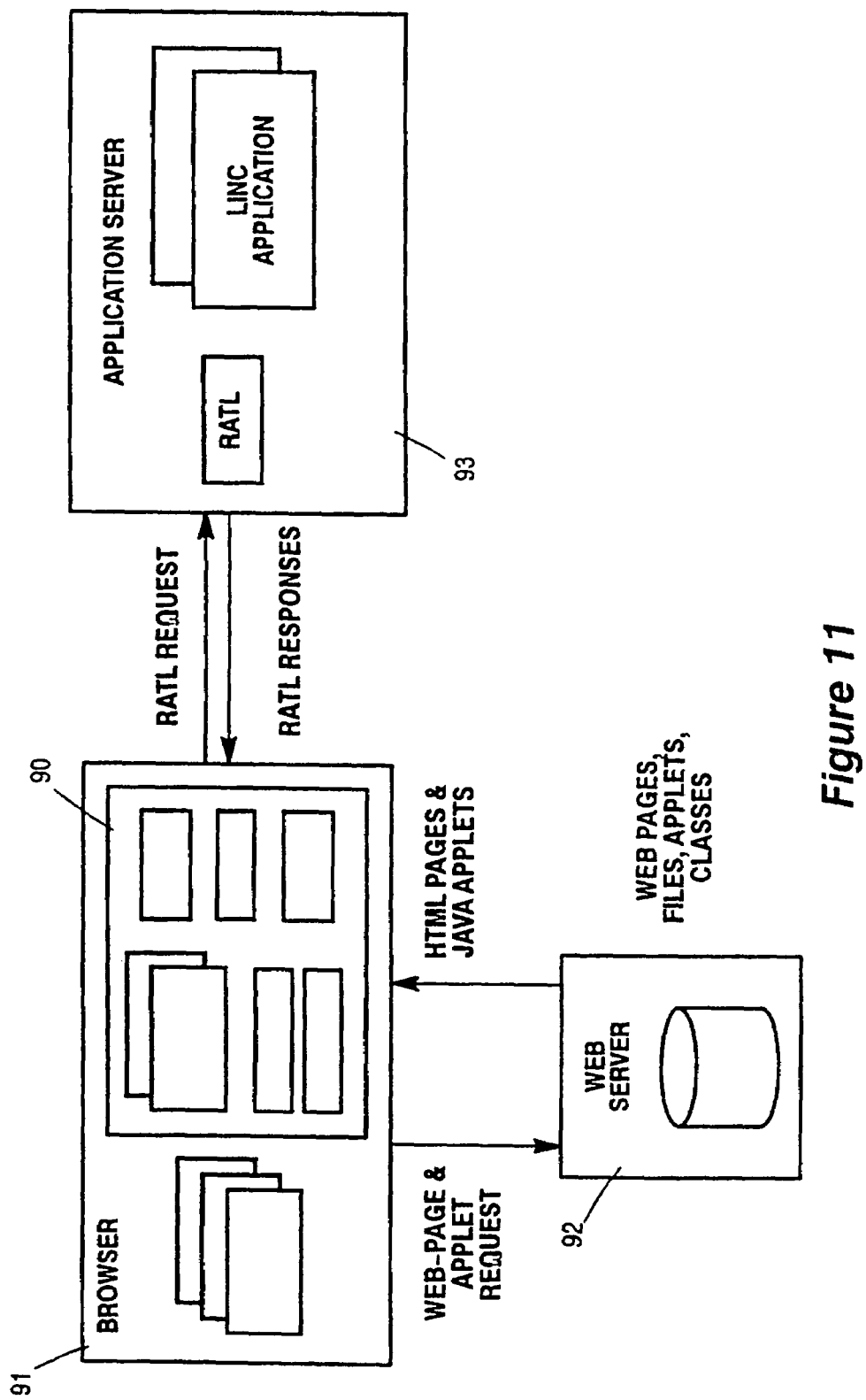
FIG. 11 illustrates the utilization of web access via outputs.

As shown in FIG. 11 the fastest and easiest way for customers to provide Web access to LINC applications through ActiveLINC is to embed a generated sample interface program as an applet 90 within a simple Web page. The user has simply to access this Web page and their browser will load down the ActiveLINC code and run the interface applet from an arbitrary webserver. The interface applet will open a connection back to the LINC application server 93 and present the initial Ispec screen or form to the user. The sample applications can be used without change or customers can add their own logic though the event-based hooks provided through the ActiveLINC programming interface. Customers can also modify the generated Java code to add more sophisticated logic and so construct their own customised client applications and applets.

As noted previously, the generated user interface applications are structured as a set of Java classes that are loaded from a Web server 92 when they are needed. This design offers much better applet loading times than could be obtained with large monolithic applications. A LINC application may have a thousand Ispecs, each with complex screens or forms. A monolithic application generated from this system would be too large to practically load down to a browser, especially over a dial-up network connection. Instead, the standard Java "class loader" is used to load down code of just those Ispecs that are used, as they are needed. The user sees a slight delay as an Ispec's classes are loaded when it is first accessed. Later access to the same Ispec is very fast as the code is in memory or locally cached.

Ispec user interface programs and components are normal Java classes and are loaded by a Web browser using standard Java and Web technology. These Ispec Java classes may be cached by the browser to avoid having to download them the next time they are needed. A user of an ActiveLINC interface applet will tend to have the Ispec classes they commonly use already loaded down to their computer and not have to wait for them to be loaded. Normal Web browser and Java technology can also be used to ensure that cached Ispec classes are current and have not been replaced by newer CW versions on the Web server. All of this caching and version checking is standard Web technology. ActiveLINC just takes advantage of it to solve the problems of distributing and managing its interface applets and components in a Web environment.

Figure 12:
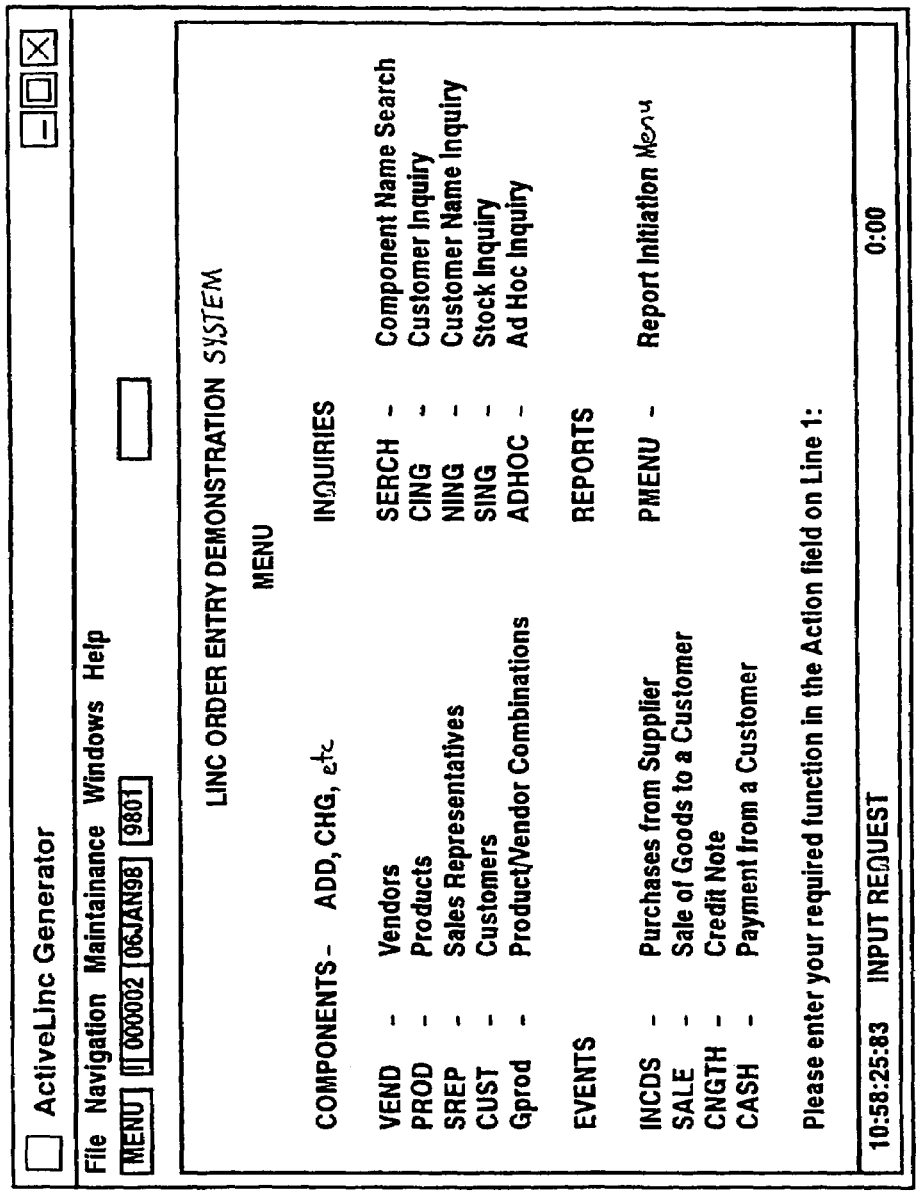
FIG. 12 illustrates a terminal based interface screen.

ActiveLINC interface programs offer all the functionality of existing terminal screens or GUI forms. FIG. 12 is a screenshot of an example terminal-based interface screen for the standard LINC 'sample' application.

ActiveLINC interface programs offer good performance and scalability. The Ispec form definitions are translated to Java code at ActiveLINC generation time to run as normal Java GUI programs. Form artifacts, such as display fields, are painted on to the user's screen by direct calls on to the standard Java graphics package. There is no run-time overhead in interpreting screen layouts. Separating out form descriptions from transaction data also improves performance. Form programs are downloaded at most once per session rather than for each form. Only transaction data is sent between the clients and servers on each exchange. The direct connections between clients and servers also adds to the good performance of ActiveLINC clients by avoiding placing heavy processing loads on web servers, such as dynamically creating HTML Web pages.

Scripted Web Pages

While generated ActiveLINC user interface programs provide a simple way to provide Web access to LINC applications they may not give users the rich, dynamic interfaces that are possible using modern Web technology. ActiveLINC supports the full power of modern HTML through its component interfaces and support for scripting languages. Customers can build complex and rich user interfaces using powerful Web page editors of their choice and link these to their LINC applications through scripting and the JavaBeans and ActiveX component interfaces.

Figure 13:
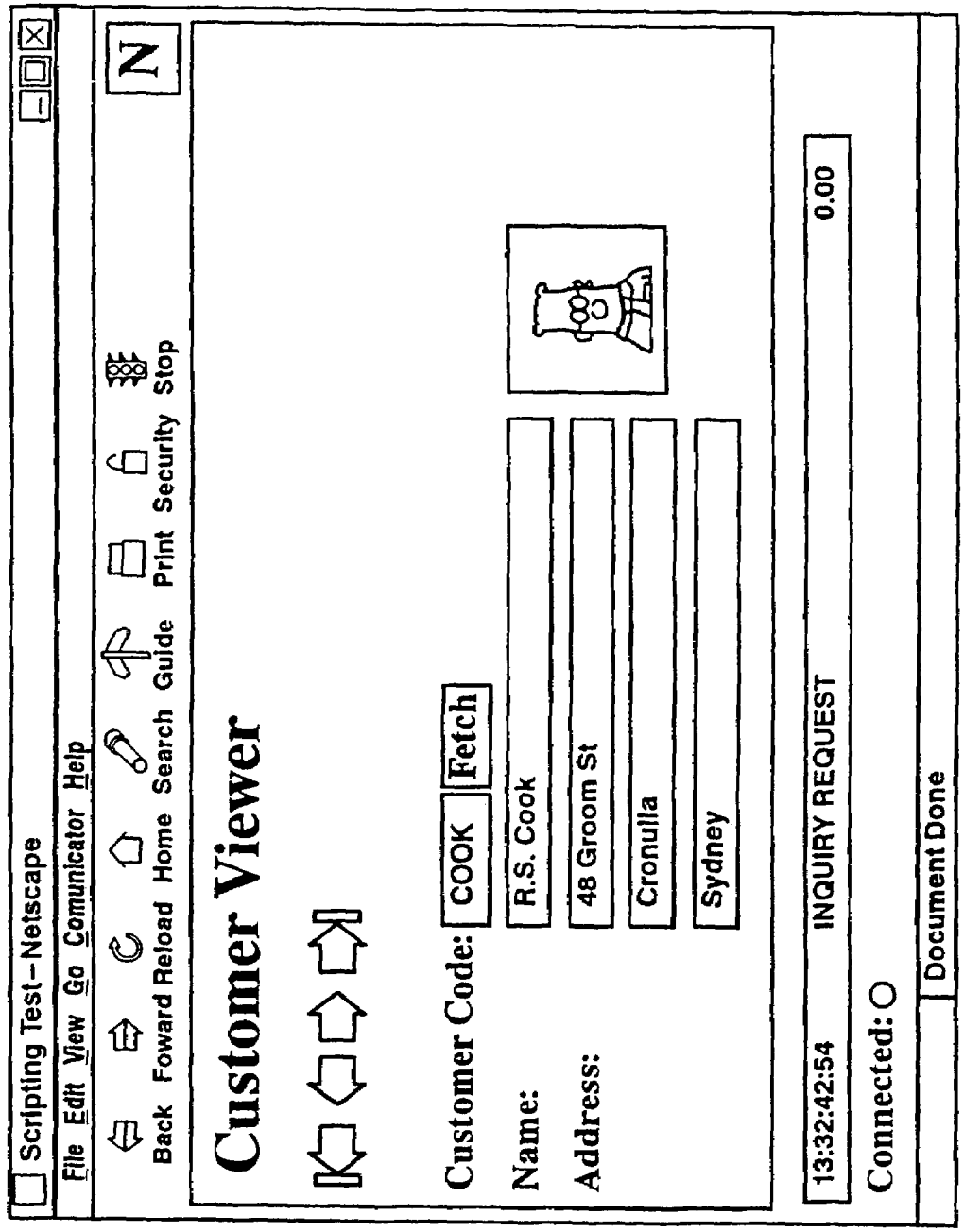
FIG. 13 illustrates a scripted web page.

For example, FIG. 13 shows a simple HTML Web page that displays customer data from a LINC application along with a picture of the customer. The script within this Web page simply fetches customer data from the LINC application, binds it to the fields on the Web page and builds the file name for the customer's picture.

The core of the JavaScript within this HTML page looks like:

cust.setField("maint", "NEX")
    inc.simpleTransaction(cust)
    form.custcode.value=cust.getFieldValue("custcode")
    form.name.value=cust.getFieldValue("name")
    form.addr1.value=cust.getFieldValue("postadd1")
    form.addr2.value=cust.getFieldValue("postadd2")
    form.addr3.value=cust.getFieldValue("postadd3")
    document('mugshot').src="images/customers/"+
    cust.getFieldValue("custcode")+".gif"

Scripted Web pages give Web interface developers access to all the power of modern dynamic HTML but requires them to build the Web pages and write the scripts.

Server-Side Scripted Web Pages

Figure 14:
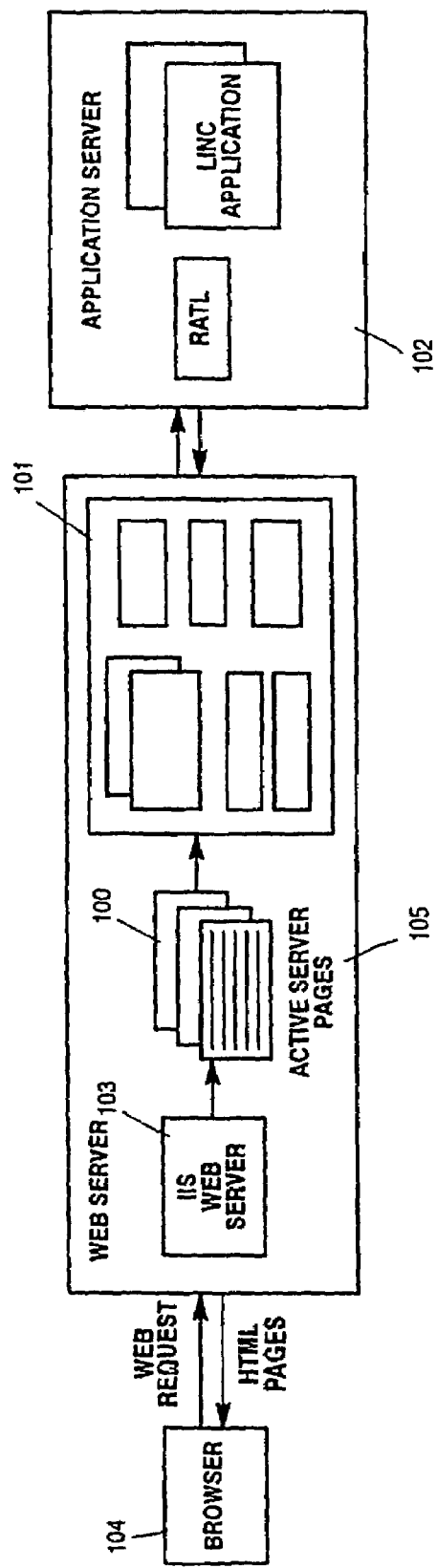
FIG. 14 illustrates schematically the utilization of scripted web pages.

Some Web servers, such as Microsoft's IIS, support server-side scripting in Web pages. Rather than just fetching a Web page and sending it back to a browser, the Web server examines the contents of the page and executes any server-side scripting it finds in there. These 'Active Server Pages' can build and alter their HTML dynamically and so can send back customised simple HTML pages to the user. Such an arrangement is illustrated in FIG. 14.

Active Web page scripts 100 can use the ActiveLINC component interfaces to access LINC applications 102. The Web server 103 can retrieve live data from the LINC application 102 and use it in dynamically building an HTML page to send back to the user 104. The ActiveLINC environment and components are run on the Web server 105 in this case and accessed as components from the scripts running on the same server.

Server-side scripting gives the Web developer the full power of HTML to build rich and complex user interfaces without placing as many demands on the Web browser. The user's Web browser need only see straight HTML, possibly without any scripting, applets or ActiveX controls. This simplicity on the client side is achieved by placing additional processing load on the Web server which may affect overall performance and throughput.

This approach offers the best chance at wide compatibility for customers who are planning to offer public Web access to selected services provided by their LINC applications. There is a wide variety of Web browsers out in the Internet and some of these may not be able to run Java applets or may be configured not to allow them for security reasons. Other Web browsers may be limited by firewalls that prevent direct TCP/IP connections back to the application server. Running the ActiveLINC interface on the Web server and only sending out HTML makes it easier for customers to ensure that their Web pages can be used generally on the Web The methods and apparatus of the present invention, or certain aspects or portions thereof, may take the form of program code (ie. instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

We claim:

1. A method for automatically adapting a legacy software application that includes interface specification definitions which include definitions of screen formats, including data fields created from legacy source code and developed for an environment comprising a centralized computing resource interconnected to a series of computer terminal devices, to a network environment, wherein said network environment comprises a system of distributed, interconnected network computing resources, said method comprising the steps of:

(a) providing a software application which utilizes said legacy source code to automatically generate a series of user interface software components from the screen format definitions to provide a graphical user interface providing at least data entry and display facilities of the interface specification definitions, the series of executable software components being executable by a scripting language running on said interconnected network computing resource, the components containing object oriented methods for setting or obtaining values of said data fields and being executable by at least one of said computing resources in said network environment, and upon execution, said computing resource is caused to interconnect with said legacy software application over said network so as to interact with said legacy software application in the transmission or receipt of information to and from said legacy software application, wherein the executable software components are capable of interacting with one of the scripting language or an intermediary software application to invoke user provided code.

2. A method in accordance with claim 1, wherein the interface software components are arranged to generate forms corresponding to forms generated by the legacy software application.

3. A method in accordance with claim 2, the client interface components include a user input object which is arranged to receive data input by a user of the network computing resource and transmit the data to the legacy application, over the network.

4. A method in accordance with claim 1, comprising the step of generating client interface components, the client interface components being arranged to interact over the network with the legacy software application.

5. A method as claimed in claim 1, wherein said series of software components are loadable and executable by an Internet Browser.

6. A method as claimed in claim 1, wherein said series of software components comprise Java code applets.

7. A method as claimed in claim 1, wherein said network environment comprises the Internet network.

8. A method as claimed in claim 1, wherein said network environment utilizes TCP/IP transfer protocols.

9. A method as claimed in claim 1, wherein said source code is written in 4GL language.

10. A method as claimed in claim 9 wherein said source code is written in the LINC language.

11. A program storage device readable by a machine, tangibly embodying a program of instructions executable by the machine to perform method steps for automatically adapting a legacy software application that includes interface specification definitions which include definitions of screen formats, created from legacy source code including data fields and developed for an environment comprising a centralized computing resource interconnected to a series of computer terminal devices, to a network environment, wherein said network environment comprises a system of distributed, interconnected network computing resources, said method comprising the steps of:

providing a software application which utilizes said source code to automatically generate a series of user interface software components from the screen format definitions to provide a graphical user interface providing at least data entry and display facilities of the interface specification definitions, the series of executable software components executable by a scripting language running on said interconnected network computing resource, said components containing object oriented methods for setting and obtaining values of said data fields and being executable by at least one of said computing resources in said network environment, and upon execution, said computing resource is caused to interconnect with said legacy software application over said network so as to interact with said legacy software application in the transmission of receipt information to and from said legacy software application, wherein the executable software components are capable of interacting with one of the scripting language or an intermediary software application to invoke user provided code.

12. A program storage device in accordance with claim 11, wherein the interface software components are arranged to generate forms corresponding to forms generated by the legacy software application.

13. A program storage device in accordance with claim 11, the method further comprising the step of generating client interface components, said client interface components being arranged to interact over the network with the legacy software application.

14. A program storage device in accordance with claim 13, wherein the client interface components include a user input object which is arranged to receive data input by a user of the network computing resource and transmit the data to the legacy application, over the network.

15. A program storage device in accordance with claim 11, wherein said series of software components are loadable and executable by an Internet Browser.

16. A program storage device in accordance with claim 11, wherein said series of software components comprise Java code applets.

17. A program storage device in accordance with claim 11, wherein said network environment comprises the Internet network.

18. A program storage device in accordance with claim 11, wherein said network environment utilizes TCP/IP transport protocols.

19. A program storage device in accordance with claim 11, wherein said source code is written in the LINC language.

20. A program storage device in accordance with claim 11, wherein said terminal screen definitions are written in a screen control language.

21. A system for automatically adapting a legacy software application that includes interface specification definitions which include definitions of screen formats, including data fields created from legacy source code and developed for an environment comprising a centralized computing resource interconnected to a series of computer terminal devices, to a network environment, wherein said network environment comprises a system of distributed, interconnected network computing resources, the system comprising:

means utilizing said legacy source code to automatically generate a series of user interface software components from the screen format definitions to provide a graphical user interface providing at lest data entry and display facilities of the interface specification definitions, the series of executable software components executable by a scripting language running said interconnected network computing resource, said executable software components containing objection oriented methods for obtaining values of said data fields and being executable by at least one of said computing resources in said network environment, and upon execution, said computing resource is caused to interconnect with said legacy software application over said network so as to interact with said legacy software application in the transmission or receipt of information to and from said legacy software application, wherein the executable software components are capable of interacting with one of the scripting language or an intermediary software application to enable the use of user hooks permitting users to have their own code invoked without requiring any changes to the generated client code.

22. A system in accordance with claim 21, wherein the interface software components are arranged to generate forms corresponding to forms generated by the legacy software application.

23. A system in accordance with claim 21, the means for producing the series of software components including means for producing the series of software components including means for generating client interface components, the client interface components being arranged to interact over the network with the legacy software application.

24. A system in accordance with claim 23, the client interface components including a user input object which is arranged to receive data input by a user of the network computing resource and transmit the data to the legacy application, over the network.

25. A system in accordance with claim 21, wherein said series of software components are loadable and executable by an Internet Browser.

26. A system in accordance with claim 21, wherein the series of software components comprise Java code applets.

27. A system in accordance with claim 21, wherein said network environment comprises the Internet network.

28. A system in accordance with claim 21, wherein said network environment utilizes TCP/IP transfer protocols.

29. A system in accordance with claim 21, wherein said source code is written in 4GL language.

30. A system in accordance with claim 21, wherein said source code is written in the LINC language.

31. A method for adapting a legacy software application wherein said legacy software application includes interface specification definitions and which includes definitions of screen formats created from legacy source code and developed for an environment comprising a centralized computing resource interconnected to a series of computer terminal devices, said centralized computing resource connected to a network environment, wherein said network environment comprises a system of distributed, interconnected network computing resources, said method comprising the steps of:

(a) providing a software application which utilizes said legacy source code to automatically produce a series of executable software components that provide the functionality for interact with said legacy software application including the steps of:

(a1) producing said series of executable software components which include the step of:

(a1a) generating a series of user interface software components from said screen format definitions, said user interface components being arranged for execution on the network computing resource to provide a graphical user interface providing at least data entry and display facilities of the interface specification definitions;

(a1b) enabling said series of software components to be executable by scripting languages on running said network computing resource;

(b) enabling said components to be executable by at least one of said computing resources in said network environment;

(c) upon execution, causing said computing resource to interconnect with said legacy software application over said network so as to interact with said legacy software application in the transmission or receipt of information to and from said legacy software application; and (d) interacting, by said executable software components, with one of said scripting languages or an intermediary software application to enable the use of hooks permitting users to have their own code invoked without requiring any changes to the generated client code.

* * * * *